United States Patent
Vajapeyam et al.

(10) Patent No.: US 10,355,828 B2
(45) Date of Patent: Jul. 16, 2019

(54) FAST RADIO LINK CONTROL ERROR RECOVERY WITH LOW LATENCY TRANSMISSIONS

(71) Applicant: QUALCOMM Incorporated, San Diego, CA (US)

(72) Inventors: Madhavan Srinivasan Vajapeyam, San Diego, CA (US); Aleksandar Damnjanovic, Del Mar, CA (US); Peter Gaal, San Diego, CA (US); Wanshi Chen, San Diego, CA (US); Hao Xu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 239 days.

(21) Appl. No.: 15/054,637

(22) Filed: Feb. 26, 2016

(65) Prior Publication Data
US 2016/0261382 A1    Sep. 8, 2016

Related U.S. Application Data

(60) Provisional application No. 62/127,179, filed on Mar. 2, 2015.

(51) Int. Cl.
*H04L 1/18* (2006.01)
*H04L 5/00* (2006.01)
(Continued)

(52) U.S. Cl.
CPC ............ *H04L 1/1812* (2013.01); *H04L 1/188* (2013.01); *H04L 1/1851* (2013.01);
(Continued)

(58) Field of Classification Search
CPC .................................. H04L 1/18; H04W 28/04
See application file for complete search history.

(56) References Cited

U.S. PATENT DOCUMENTS

2006/0282739 A1* 12/2006 Meyer ................... H04L 1/1607
                                                        714/748
2009/0316638 A1* 12/2009 Yi ....................... H04W 72/042
                                                        370/329
(Continued)

OTHER PUBLICATIONS

Interdigital, "Forwarding of Non-consecutive Data Blocks," TSG RAN Working Group 2 Meeting # 24, New York, USA, TSGR2#24(01)2342, R2-012342, Aug. 22-26, 2001, 2 pgs., XP_50119116A, 3rd Generation Partnership Project.
(Continued)

*Primary Examiner* — Shukri Taha
(74) *Attorney, Agent, or Firm* — Holland & Hart LLP

(57) ABSTRACT

Methods, systems, and devices for communication are described. Fast error recovery procedures may be employed that decrease latency for radio link control (RLC) data packet recovery during low latency operations. A device may detect a failed low latency transmission, and may activate a timer associated with the failed transmission. The device may generate a failure report if failed transmissions are not rescheduled; for example, if the timer expires before rescheduling. The failure report may be sent to an RLC entity of the device or to a medium access control (MAC) layer entity of the scheduler. In some cases, the device may maintain a list of non-terminated transmissions for high priority bearers.

28 Claims, 15 Drawing Sheets

(51) Int. Cl.
*H04W 24/08* (2009.01)
*H04L 1/12* (2006.01)
(52) U.S. Cl.
CPC .......... *H04L 1/1874* (2013.01); *H04L 1/1893* (2013.01); *H04L 5/0055* (2013.01); *H04W 24/08* (2013.01); *H04L 2001/125* (2013.01)

(56) References Cited

U.S. PATENT DOCUMENTS

| | | | | |
|---|---|---|---|---|
| 2010/0002630 | A1* | 1/2010 | Park | H04L 1/1812 370/328 |
| 2010/0027413 | A1* | 2/2010 | Park | H04L 1/1829 370/216 |
| 2010/0111067 | A1* | 5/2010 | Wu | H04W 74/008 370/345 |
| 2012/0201219 | A1* | 8/2012 | Wager | H04L 1/1812 370/329 |
| 2015/0124719 | A1* | 5/2015 | Lim | H04L 1/1812 370/329 |
| 2016/0294531 | A1* | 10/2016 | Loehr | H04W 72/0413 |
| 2017/0325164 | A1* | 11/2017 | Lee | H04W 52/0216 |
| 2018/0206289 | A1* | 7/2018 | Kim | H04W 4/06 |

OTHER PUBLICATIONS

ISA/EP, International Search Report and Written Opinion of the International Searching Authority, Int'l App. No. PCT/US2016/020119, dated May 30, 2016, European Patent Office, Rijswijk, NL, 14 pgs.

Nokia, "ARQ Operation with HARQ-ARQ Interaction," 3GPP TSG-RAN WG2 Meeting #55, Seoul, Korea, R2-062765, Oct. 9-13, 2006, 8 pgs., XP_50132296A, 3rd Generation Partnership Project.

Philips, "Error-Recovery for S&W in HSDPA," TSG-RAN Working Group 2 (Radio layer 2 and Radio layer 3), New York, USA, TSGR2#24(01)2366, R2-012366, Oct. 22-26, 2001, 6 pgs., XP_50601945A, 3rd Generation Partnership Project.

* cited by examiner

FAST RADIO LINK CONTROL ERROR RECOVERY WITH LOW LATENCY TRANSMISSIONS

CROSS REFERENCES

The present Application for Patent claims priority to U.S. Provisional Patent Application No. 62/127,179 by Vajapeyam et al., entitled "Fast RLC Error Recovery with Low Latency Transmissions," filed Mar. 2, 2015, assigned to the assignee hereof.

BACKGROUND

The following relates generally to wireless communication, and more specifically to fast radio link control (RLC) error recovery with low latency transmissions. Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems (e.g., a Long Term Evolution (LTE) system). A wireless multiple-access communications system may include a number of base stations, each simultaneously supporting communication for multiple communication devices, which may be otherwise known as user equipment (UE).

RLC error recovery procedures may be used by a device to recover from transmission failures by determining if a set of data packets has been received correctly and in the desired order. In some cases, a transmitting device may assign sequence numbers (SNs) to the set of data packets. A receiving device may start a reordering timer if a data packet is received out of order. At the expiration of the reordering timer the receiving device may send a status report to a transmitting device indicating a data packet has not been received and the transmitting device may schedule a retransmission. However, the time delay for an RLC error recovery process to schedule a retransmission may be unsuitable for low latency communications.

SUMMARY

A device may use fast error recovery procedures that decrease latency for radio link control (RLC) data packet recovery during low latency operations. The device may detect a failed low latency transmission and activate a timer associated with the failed transmission. If the timer expires before the failed transmission is rescheduled, the device may generate a failure report. The failure report may be sent to an RLC entity, a Packet Data Convergence Protocol (PDCP) entity, or a medium access control (MAC) entity of the receiving device, of a transmitting device, or of a scheduler. In some cases, the device may maintain a list of non-terminated transmissions, such as active hybrid automatic repeat requests (HARQ) processes, for high priority bearers (e.g., bearers associated with low-latency data).

A method of wireless communication is described. The method may include detecting, at a receiving device, a transmission error based at least in part on a state of a HARQ process, initiating a timer based at least in part on the detection of the transmission error, determining that the timer has expired before a grant for a retransmission for the HARQ process has been received and reporting, to a transmitting device, the transmission error based at least in part on the determination.

An apparatus for wireless communication is described. The apparatus may include means for detecting, at a receiving device, a transmission error based at least in part on a state of a HARQ process, means for initiating a timer based at least in part on the detection of the transmission error, means for determining that the timer has expired before a grant for a retransmission for the HARQ process has been received and means for reporting, to a transmitting device, the transmission error based at least in part on the determination.

A further apparatus is described. The apparatus may include a processor, memory in electronic communication with the processor, and instructions stored in the memory. The instructions may be operable to cause the processor to detect, at a receiving device, a transmission error based at least in part on a state of a HARQ process, initiate a timer based at least in part on the detection of the transmission error, determine that the timer has expired before a grant for a retransmission for the HARQ process has been received and report, to a transmitting device, the transmission error based at least in part on the determination.

A non-transitory computer readable medium for wireless communication is described. The non-transitory computer-readable medium may include instructions to cause a processor to detect, at a receiving device, a transmission error based on a state of a HARQ process, initiate a timer based on the detection of the transmission error, determine that the timer has expired before a grant for a retransmission for the HARQ process has been received and report, to a transmitting device, the transmission error based on the determination.

In some examples of the method, apparatus, or non-transitory computer-readable medium described above, reporting the transmission error comprises: sending, by the receiving device, an error indication to an RLC entity, a PDCP entity, or a MAC entity of the transmitting device.

Some examples of the method, apparatus, or non-transitory computer-readable medium described above may further include processes, features, means, or instructions for sending the error indication comprises sending the error indication to an entity of the transmitting device using a contention based resource.

Some examples of the method, apparatus, or non-transitory computer-readable medium described above may further include processes, features, means, or instructions for maintaining a list of non-terminated transmissions, where reporting the transmission error is based on the list.

In some examples of the method, apparatus, or non-transitory computer-readable medium described above, each entry in the list is mapped to a time index.

In some examples of the method, apparatus, or non-transitory computer-readable medium described above, reporting the transmission error comprises: sending, to the transmitting device, a bitmap corresponding to the list.

In some examples of the method, apparatus, or non-transitory computer-readable medium described above, the list is limited to a set of high priority HARQ processes, where the HARQ process is an element of the set of high priority HARQ processes.

In some examples of the method, apparatus, or non-transitory computer-readable medium described above, the set of high priority HARQ processes is determined based on latency mode of operation.

Some examples of the method, apparatus, or non-transitory computer-readable medium described above may further include processes, features, means, or instructions for identifying a new data indicator (NDI) for the HARQ process prior to expiration of the timer, where reporting the transmission error is based on the NDI.

Some examples of the method, apparatus, or non-transitory computer-readable medium described above may further include processes, features, means, or instructions for selecting a fast recovery mode, where initiating the timer is based on the selection.

In some examples of the method, apparatus, or non-transitory computer-readable medium described above, the selection is based on latency mode of operation.

In some examples of the method, apparatus, or non-transitory computer-readable medium described above, the selection is based on a configuration of at least one high priority bearer.

Some examples of the method, apparatus, or non-transitory computer-readable medium described above may further include processes, features, means, or instructions for transmitting a negative acknowledgement (NACK) based on the state of the HARQ process.

Some examples of the method, apparatus, or non-transitory computer-readable medium described above may further include processes, features, means, or instructions for maintaining a set of transport blocks in a buffer for a minimum time period for retransmission.

BRIEF DESCRIPTION OF THE DRAWINGS

Aspects of the disclosure are described in reference to the following figures.

DETAILED DESCRIPTION

According to the present disclosure, a device may use fast error recovery procedures to decrease latency for radio link control (RLC) data packet recovery during low latency operations. Aspects of the disclosure are described in the context of a wireless communication system. For example, a device may select a fast error recovery mode for a component carrier that is associated with low-latency data and may activate a timer to expedite the data recovery process. In some examples, the fast error recovery mode may reduce data recovery after a negative acknowledgement (NACK) to acknowledgement (ACK) error. These and other aspects of the disclosure are further illustrated by and described with reference to apparatus diagrams, system diagrams, and flowcharts that relate to fast error recovery mode.

Figure 1:
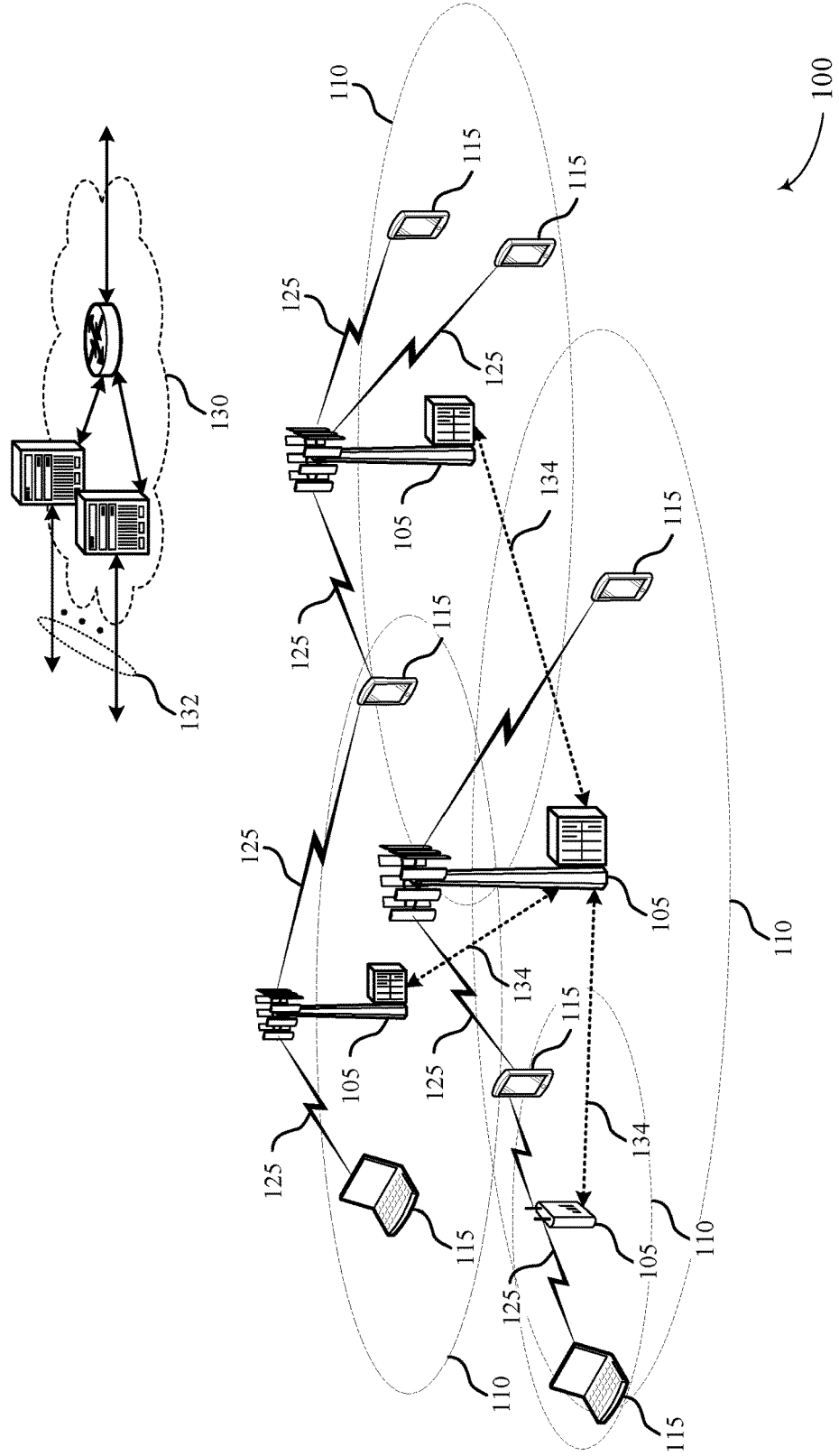
FIG. 1 illustrates an example of a wireless communications system that supports fast RLC error recovery with low latency transmissions in accordance with various aspects of the present disclosure.

FIG. 1 illustrates an example of a wireless communications system 100 for fast RLC error recovery with low latency transmissions in accordance with various aspects of the present disclosure. The wireless communications system 100 includes base stations 105, UEs 115, and a core network 130. In some examples, the wireless communications system 100 may be a Long Term Evolution (LTE)/LTE-Advanced (LTE-A) network.

The base stations 105 may wirelessly communicate with the UEs 115 via one or more base station antennas. Each of the base stations 105 may provide communication coverage for a respective geographic coverage area 110. The communication links 125 shown in wireless communications system 100 may include uplink (UL) transmissions from a UE 115 to a base station 105, or downlink (DL) transmissions, from a base station 105 to a UE 115. The base stations 105 may support, and may communicate with one another to fast recovery procedures. For example, the base stations 105 may interface with the core network 130 through backhaul links 132 (e.g., S1, etc.). The base stations 105 may also communicate with one another over backhaul links 134 (e.g., X1, etc.) either directly or indirectly (e.g., through core network 130). The base stations 105 may perform radio configuration and scheduling for communication with the UEs 115, or may operate under the control of a base station controller (not shown). In various examples, base stations 105 may be macro cells, small cells, hot spots, or the like. The base stations 105 may also be referred to as eNodeBs (eNBs) 105 in some examples.

The UEs 115 may be dispersed throughout the wireless communications system 100, and each UE 115 may be stationary or mobile. A UE 115 may also be referred to as a mobile station, a subscriber station, a remote unit, a wireless device, an access terminal, a handset, a user agent, a client, or some other suitable terminology. A UE 115 may also be a cellular phone, a wireless modem, a handheld device, a personal computer, a tablet, a personal electronic device, a machine type communication (MTC) device or the like. The UEs 115 may communicate with base stations 105, and may support fast recovery procedures.

A UE may be configured with multiple carriers in carrier aggregation (CA) configuration, and the communication links 125 may represent such multicarrier CA configurations. A carrier may also be referred to as a component carrier (CC), a layer, a channel, etc. The term "component carrier" may refer to each of the multiple carriers utilized by a UE in CA operation, and may be distinct from other portions of system bandwidth. For instance, a CC may be a relatively narrow-bandwidth carrier susceptible of being utilized independently or in combination with other component carriers. Each CC may provide the same capabilities as an isolated carrier based on release 8 or release 9 of the LTE standard. Multiple component carriers may be aggregated or utilized concurrently to provide some UEs 115 with greater bandwidth and, e.g., higher data rates. Thus, an individual CC may be backwards compatible with legacy UEs 115 (e.g., UEs 115 implementing LTE release 8 or release 9); while other UEs 115 (e.g., UEs 115 implementing post-release 8/9 LTE versions), may be configured with multiple component carriers in a multi-carrier mode. A carrier used for DL may be referred to as a DL CC, and a carrier used for UL may be referred to as an UL CC. A UE 115 may be configured with multiple DL CCs and one or more UL CCs for carrier aggregation. Each carrier may be used to transmit control information (e.g., reference signals, control channels, etc.), overhead information, data, etc.

A UE 115 may communicate with a single base station 105 utilizing multiple carriers, or may also communicate with multiple base stations 105 simultaneously on different carriers. Each cell of a base station 105 may include a UL CC and a DL CC. The coverage area 110 of each serving cell for a base station 105 may be different (e.g., CCs on different frequency bands may experience different path loss). In some examples, one carrier is designated as the primary carrier, or primary component carrier (PCC), for a UE 115, which may be served by a primary cell (PCell). Primary cells may be semi-statically configured by higher layers (e.g., radio resource control (RRC), etc.) on a per-UE basis. Certain uplink control information (UCI), e.g., ACK/NACK, channel quality indicator (CQI), and scheduling information transmitted on physical uplink control channel (PUCCH), are carried by the PCell. Additional carriers may be designated as secondary carriers, or secondary component carriers (SCC), which may be served by secondary cells (SCells). SCells may likewise be semi-statically configured on a per-UE basis. In some cases, secondary cells may not include or be configured to transmit the same control information as the primary cell.

In some cases, wireless communications system 100 may utilize one or more enhanced component carriers (eCCs). An eCC may be characterized by one or more features including: flexible bandwidth, different transmission time intervals (TTIs), and modified control channel configuration. In some cases, an eCC may be associated with a CA configuration or a dual connectivity configuration (e.g., when multiple serving cells have a suboptimal backhaul link). An eCC may also be configured for use in unlicensed spectrum or shared spectrum (e.g., where more than one operator is licensed to use the spectrum). An eCC characterized by flexible bandwidth may include one or more segments that may be utilized by UEs 115 that are not capable of monitoring the whole bandwidth or prefer to use a limited bandwidth (e.g., to conserve power).

In some cases, an eCC may utilize a different TTI length than other CCs, which may include use of a reduced or variable symbol duration as compared with TTIs of the other CCs. The symbol duration may remain the same, in some cases, but each symbol may represent a distinct TTI. In some examples, an eCC may include multiple hierarchical layers associated with the different TTI lengths. For example, TTIs at one hierarchical layer may correspond to uniform 1 ms subframes, whereas in a second layer, variable length TTIs may correspond to bursts of short duration symbol periods.

In some cases, a shorter symbol duration may also be associated with increased subcarrier spacing. In conjunction with the reduced TTI length, an eCC may utilize dynamic time division duplex (TDD) operation (i.e., the eCC may allow switching from DL to UL operation for short bursts according to dynamic conditions.)

Flexible bandwidth and variable TTIs may be associated with a modified control channel configuration (e.g., an eCC may utilize an enhanced physical downlink control channel (ePDCCH) for DL control information). For example, one or more control channels of an eCC may utilize frequency-division multiplexing (FDM) scheduling to accommodate flexible bandwidth use. Other control channel modifications include the use of additional control channels (e.g., for evolved multimedia broadcast multicast service (eMBMS) scheduling, or to indicate the length of variable length UL and DL bursts), or control channels transmitted at different intervals. An eCC may also include modified or additional hybrid automatic repeat request (HARM) related control information. A UE 115 may operate on an eCC, and other CCs, using discontinuous reception.

Wireless communications system 100 may operate on multiple layers. The two lowest layers may include the medium access control (MAC) or data link layer, and the physical (PHY) layer. Wireless communications system 100 may also include an RLC layer that connects higher layers (e.g., radio resource control (RRC) layer and the packet data convergence protocol (PDCP) layer) to the lower layers (e.g., the MAC layer). An RLC entity in a base station 105 or a UE 115 may ensure that transmission packets are organized into appropriately sized blocks (corresponding to the MAC layer transport block size). If an incoming data packet (i.e., a PDCP or RRC service data unit (SDU)) is too big for transmission, the RLC layer may segment the data packet into several smaller RLC protocol data units (PDUs). If the incoming data packets are too small, the RLC layer may concatenate several of them into a single, larger RLC PDU. Each RLC PDU may include a header including information about how to reassemble the data. The RLC layer may also ensure that packets are reliably transmitted. The transmitter may keep a buffer of indexed RLC PDUs, and continue retransmission of each PDU until receiving the corresponding ACK. In some cases, the transmitter may send a poll request to determine which PDUs have been received and the receiver may respond with a Status Report. Unlike the MAC layer HARQ function, RLC automatic repeat request (ARQ) may not include forward error correction (FEC).

An RLC entity may operate in one of three modes: acknowledged mode (AM), unacknowledged mode (UM) and transparent mode (TM). In AM, the RLC entity may perform segmentation/concatenation and ARQ. This mode may be appropriate for delay tolerant or error sensitive transmissions. In UM, the RLC entity may perform segmentation/concatenation but not error recovery. This may be appropriate for delay sensitive or error tolerant traffic (e.g., voice over LTE (VoLTE)). TM only performs data buffering, and does not include either concatenation/segmentation or ARQ. TM may be used primarily for sending broadcast control information (e.g., the master information block (MIB) and system information blocks (SIBs)), paging messages, and RRC connection messages. Some transmissions may be sent without RLC (e.g., a random access channel (RACH) preamble and response).

At the MAC layer, HARQ may be a method of ensuring that data is received correctly over a wireless communication link 125. HARQ may include a combination of error detection (e.g., using a cyclic redundancy check (CRC)), FEC, and retransmission (e.g., ARQ). HARQ may improve throughput at the MAC layer in poor radio conditions (e.g., signal-to-noise conditions). In Incremental Redundancy HARQ, incorrectly received data may be stored in a buffer and combined with subsequent transmissions to improve the overall likelihood of successfully decoding the data. In some cases, redundancy bits are added to each message prior to transmission. This may be especially useful in poor conditions. In other cases, redundancy bits are not added to each transmission, but are retransmitted after the transmitter of the original message receives a NACK indicating a failed attempt to decode the information.

Thus, a base station 105 and a UE 115 may use multiple recovery procedures to correct transmission failures. For example, an RLC entity may be configured to operate in RLC-AM and may schedule retransmissions for data packets that have not been correctly received by the UE 115. The RLC recovery process may operate at a slower rate than the MAC recovery process, and may be used to mitigate errors that have been missed by the MAC process. For example, ACK/NACK errors associated with a HARQ process, physical downlink control channel (PDCCH) erasures, etc.

A transmitting device's RLC may assign a sequence number (SN) to each PDU (i.e., data packet) in a set of PDUs according to the order that they should be received by a UE 115. The PDUs may then be passed to the MAC layer where they may be segmented and rearranged into transport blocks. The transport blocks may then be associated with corresponding HARQ processes and sent to a UE 115. The receiver may reassemble them at the UE's 115 MAC layer. The transport blocks may be sent to the UE RLC entity, where the UE 115 may determine each data packet's SN. The SNs may be used to determine if the data packets have been received in the proper order. For example, the receiving device may start a reordering timer if a data packet: SN(n+1) with a higher SN is received before a data packet: SN(n) with a lower sequence number. For example, the receiver may use identified data packets to update a state variable VR(H), which is equal to the (highest received SN)+1 and VR(R), which is equal to the (highest in-order received SN)+1. If VR(H)>VR(R), the receiver may detect that a SN (i.e., data packet) is missing and start the reordering timer (which may be based on HARQ retransmission protocols). At the expiration of the reordering timer the receiving device may send a status report to a transmitting device indicating that data packet SN(n) has not been received and the transmitting device may, accordingly, schedule a retransmission for missing data packet SN(n).

The RLC recovery process may introduce latency to a communication link. For instance, the UE 115 may not detect a missing SN (e.g., SN (n)) until a subsequent SN (e.g., SN(n+1)) has been correctly received. The UE 115 may also wait until the reordering timer has expired prior to sending the status report to the base station 105. Furthermore, the UE 115 may transmit an SR and wait for the base station 105 to schedule a transmission window for the status report.

For example, a delay may occur after a HARQ error. That is, a UE 115 may fail to receive transport blocks associated with a data packet: SN1. After the unsuccessful transmission, the UE 115 may transmit a NACK to a base station 105. Base station 105, however, may incorrectly detect the NACK as an ACK and continue to transmit subsequent transport blocks for data packet: SN1. Therefore, the UE's 115 RLC receiver may fail to receive an expected retransmission for the failed transport block, and therefore fail to successfully receive the data packet containing the transport block. The UE 115 may then wait until a subsequent data packet (e.g., data packet: SN2, SN3, etc.) has been successfully received before determining that SN1 was not been received in the proper order. This type of error may be referred to as a NACK to ACK error, for which an RLC recovery procedure may take 20 ms or more to detect.

The delays associated with the RLC recovery process may be unsuitable for particular latency modes of operation (e.g., low latency operations, ultra-low latency operations). For example, low latency operations may accommodate delays as low as 1 ms. Moreover, the shorter TTIs that may be utilized by low latency communication may decrease the reliability of control channels and increase error probabilities for a transport block. Consequently, recovery procedures may be more frequent during low latency operation and as a result, latency for the communication link may increase accordingly. Therefore, a device, such as a base station 105 or a UE 115, may use fast error recovery procedures to decrease latency for RLC data packet recovery during low latency operations. The device may select a fast error recovery mode for a CC that is associated with low-latency data and activate a timer (different from and shorter than the RLC reordering timer) to expedite the data recovery process. If the timer expires before the failed transmission is rescheduled, the device may generate a failure report. The failure report may be sent to an RLC entity a PDCP entity, or a MAC entity of the receiving device, of the transmitting device, or of the scheduler. The fast error recovery mode may reduce data recovery after a NACK to ACK error or other transmission error.

Figure 2:
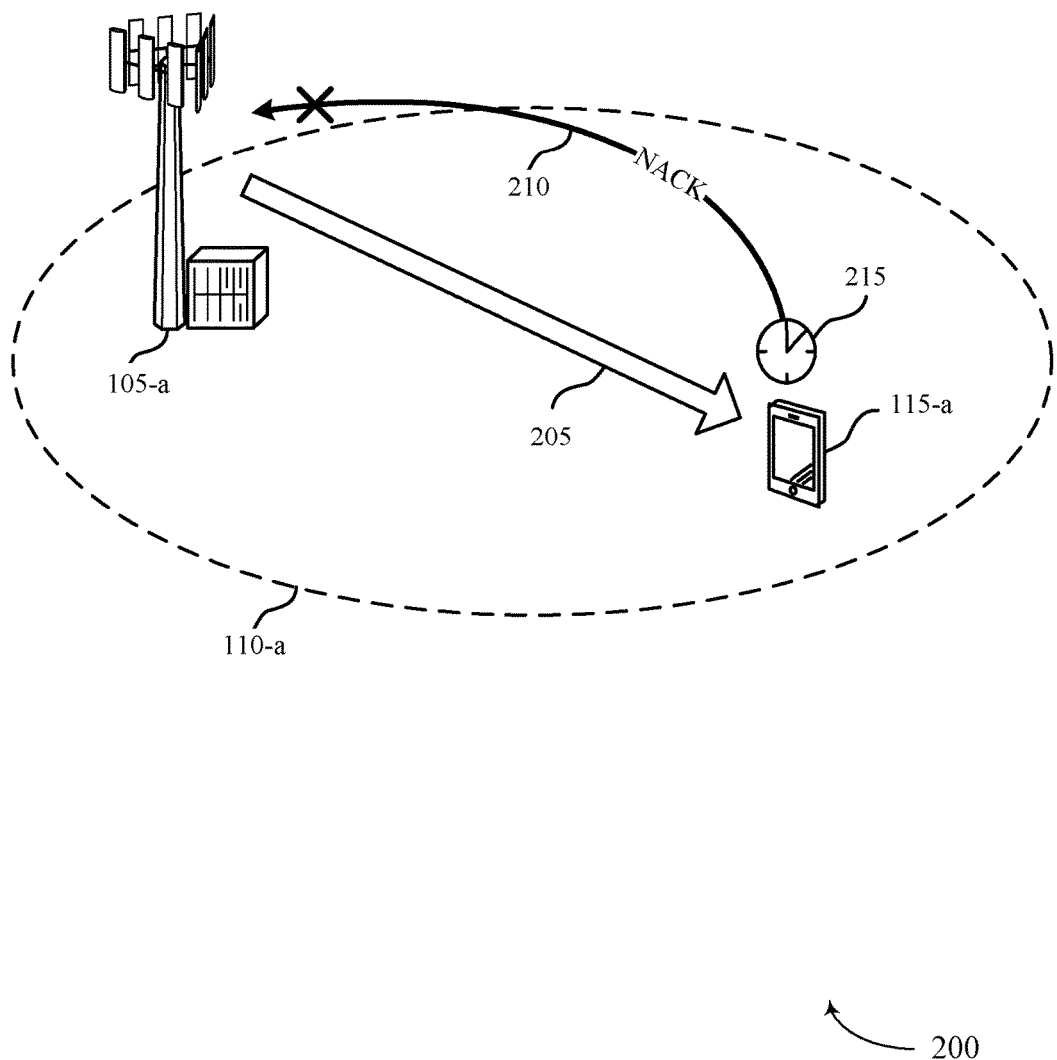
FIG. 2 illustrates an example of a wireless communications system that supports fast RLC error recovery with low latency transmissions in accordance with various aspects of the present disclosure.

FIG. 2 illustrates an example of a wireless communications system 200 for fast RLC error recovery with low latency transmissions in accordance with various aspects of the present disclosure. Wireless communications system 200 may include UE 115-a and base station 105-a, which may be examples of a UE 115 or a base station 105 described above with reference to FIG. 1. Base station 105-a and UE 115-a may communicate with one another via downlink 205 when UE 115-a is within coverage area 110-a, as generally described above with reference to FIG. 1. UE 115-a may send ACK/NACKs to base station 105-a via uplink 210 as generally described above with reference to FIG. 1.

UE 115-a may receive a set of transport blocks from base station 105-a via downlink 205. In some cases, the transport blocks may contain low-latency data. (e.g., the transport blocks may be sent over an eCC using a reduced TTI). UE 115-a may select a fast recovery mode for bearers associated with the low-latency transport blocks. UE 115-a may maintain a list of all non-terminated transmissions and may monitor the state of the non-terminated transmissions for a configurable window of time. In some examples, the non-terminated transmissions may be active HARQ processes or transport blocks. In some cases, the UE 115-a may fail to decode a transport block and may send a NACK via uplink 210 to base station 105-a. UE 115-a may concurrently initiate a timer 215 associated with the failed transport block. The timer 215 may be integral to the UE 115-a (e.g., the timer may be a module within a processor of the UE 115-a). In some cases, timer 215 may expire before the failed transport block is re-scheduled by base station 105-a and a reporting procedure may be triggered. The reporting procedure may include sending a failure report to the base station 105-a that indicates which non-terminated transmissions have failed. In some cases, the failure report may additionally include information for other non-terminated transmissions in the list whose associated timers 215 have not expired.

In some examples, UE 115-a may send the failure report to base station 105-a so that base station 105-a (e.g., at the MAC layer) may determine which transmissions should be rescheduled. In another example, the UE 115-a MAC entity may inform the UE 115-a RLC entity of potential problems for the low latency (and, therefore, potentially high priority) bearers. The RLC entity may then trigger an early SN status report to base station 105-a so that base station 105-a may determine which data packets should be rescheduled. In other examples, the UE 115-a may send an error indication to an entity (e.g., an RLC entity, a PDCP entity, or a MAC entity) of the base station 105-a so that base station 105-a may determine which data packets should be rescheduled.

In another example, base station 105-a may similarly utilize the fast error recovery mode. For example, during UL transmissions, the base station's 105-a MAC entity may detect an error, initiate a timer, and generate an error report if the timer expires prior to receiving an UL retransmission. In one example, the error is reported to the base station RLC entity. In some examples, the base station 105-a MAC entity may provide the failure report directly to the base station's 105-a scheduler to request a retransmission from UE 115-a. In other examples, the base station 105-a PDCP entity may provide the failure report directly to the base station's 105-a scheduler to request a retransmission from UE 115-a.

Figure 3:
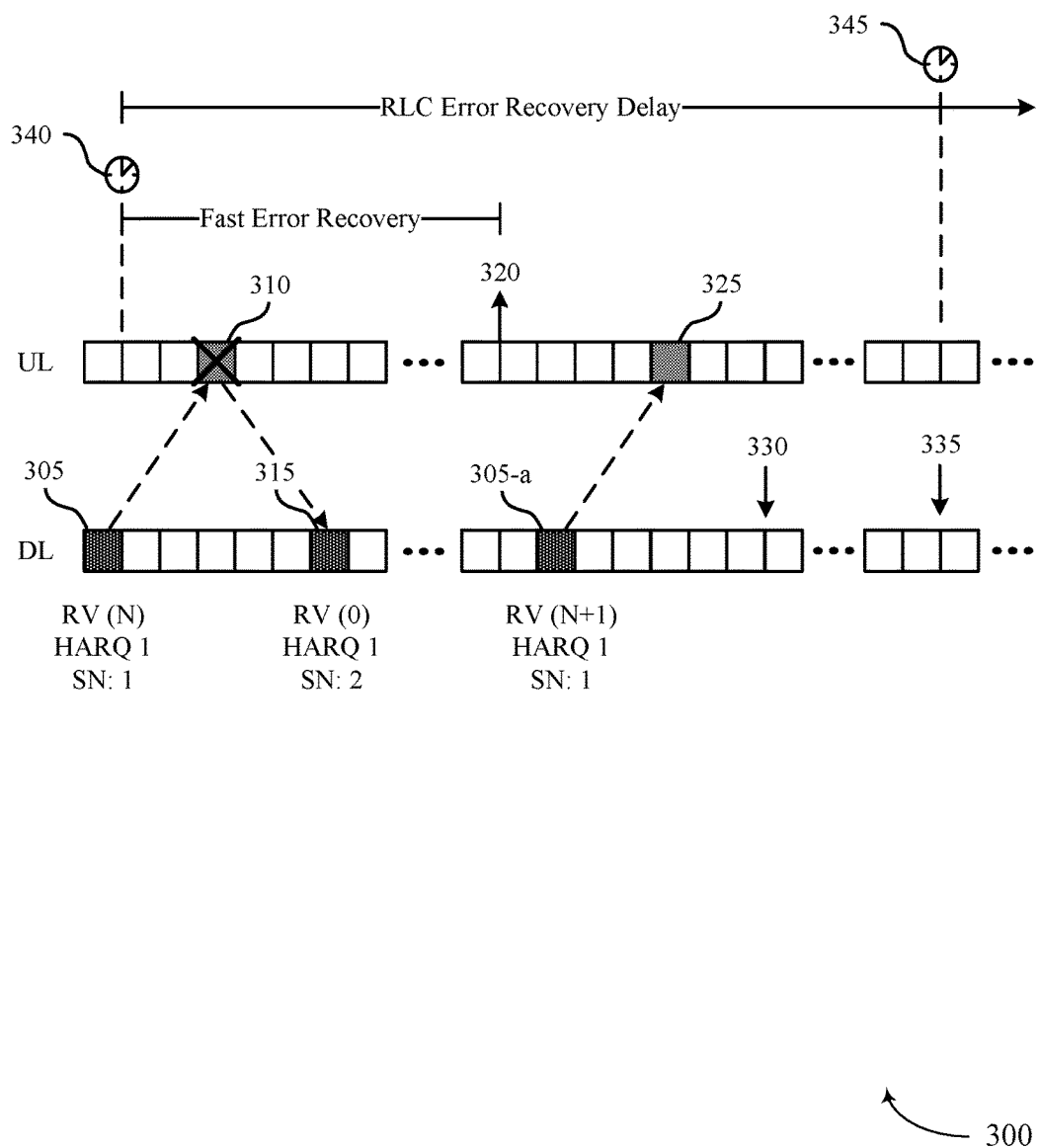
FIG. 3 illustrates an example of a channel structure that supports fast RLC error recovery with low latency transmissions in accordance with various aspects of the present disclosure.

FIG. 3 illustrates an example of a channel structure 300 for fast RLC error recovery with low latency transmissions in accordance with various aspects of the present disclosure. Channel structure 300 may illustrate aspects of a low latency transmission between a UE 115 and a base station 105, as described above with reference to FIGS. 1-2.

In some examples, a UE 115 may receive and fail to decode a transport block 305. The data in transport block 305 may be associated with a HARQ process: HARQ 1, a data packet: SN1, and may be an nth retransmission: RV(N). The UE 115 may detect the failed transmission, update a list of non-terminated transmissions with an entry associated with transport block 305, and start timer 340. Subsequently or concurrently, the UE 115 may transmit a NACK to a base station 105. In some cases, the NACK may be misinterpreted at the base station 105 as an ACK, in a NACK to ACK error 310. HARQ 1 may, therefore, schedule subsequent transport block 315 with a new data transmission, RV(0), while the UE 115 may be expecting a retransmission of the data in transport block 305. Timer 340 may continue to run until either the UE 115 identifies that the data in transport block 305 has been rescheduled or until timer 340 expires. Since the data in transport block 305 has not been rescheduled, the UE 115 may detect the error and send a failure report 320 (e.g., to an entity of the base station 105) at the expiration of timer 340 to inform the base station 105 of the transmission failure of the data in transport block 305. The base station 105-a may use the failure report 320 to reschedule the data in transport block 305 for retransmission in transport block 305-a. In some cases, The UE 115 may successfully receive the retransmission in transport block 305-a and send an ACK 325 to base station 105. In some cases, the UE 115 may determine the first data packet has been successfully received at indicator 330 and the state variables VR(H) and VR(R) may be updated to equal 2 (or the last successfully received SN). At a later time, UE 115 may determine the second data packet has been successfully received at indicator 335 the state variables VR(H) and VR(R) may be updated again.

Under RLC recovery protocol, the wireless network may not detect the NACK to ACK error 310 for a lengthy period of time (e.g., a time period incompatible with low latency communication) and the transmission of data packet: SN1 may be unsuccessful. Therefore, the state variable values at indicator 330 may be unchanged (i.e., VR(H) and VR(R) equal to 1). At a later time, the UE 115 may successfully receive the second data packet at indicator 335 and state variable VR(H) may equal 3 while VR(R) may equal 1. This may satisfy the condition VR(H)>VR(R) and the UE 115 may start reordering timer 345. At the expiration of the reordering timer the UE's 115 RLC transmitter may send a status report alerting the base station 105 that data packet: SN1 has not been received and the base station 105 may schedule a retransmission for data packet: SN1. The difference between the endpoint of reordering timer 345 (not shown) and timer 340 may illustrate a portion of the delay associated with RLC recovery procedures that may be reduced using a fast error recovery procedure.

Figure 4:
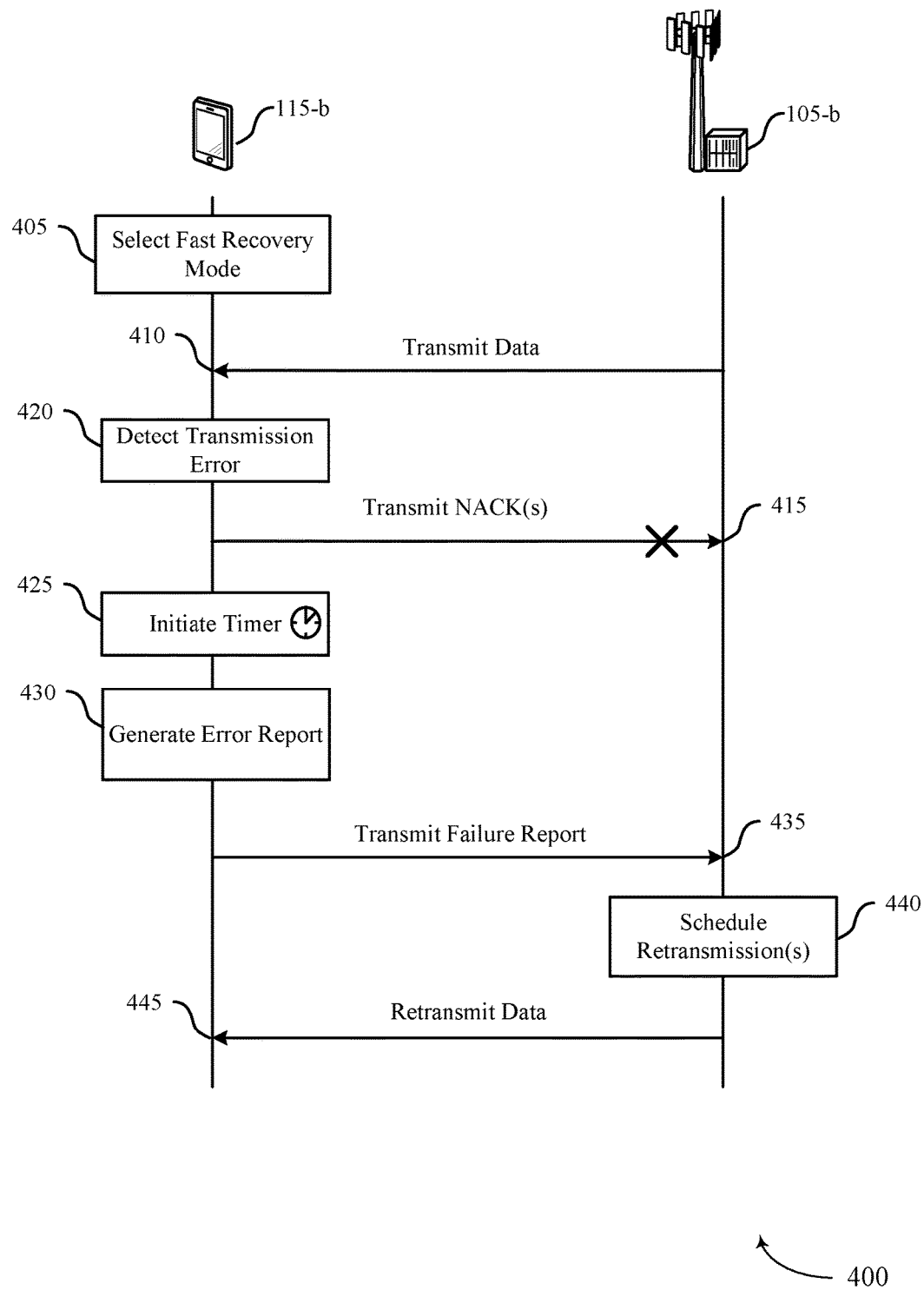
FIG. 4 illustrates an example of a process flow for a system that supports fast RLC error recovery with low latency transmissions in accordance with various aspects of the present disclosure.

FIG. 4 illustrates an example of a process flow 400 for fast RLC error recovery with low latency transmissions in accordance with various aspects of the present disclosure. Process flow 400 may be performed by UE 115-b and base station 105-b which may be examples of a UE 115 or base station 105 as described above with reference to FIGS. 1-2. In some examples, UE 115-b may monitor non-terminated transmissions and activate timers for failed transmissions. If the timers expire, UE 115-b may transmit a failure report requesting rescheduling of the failed transmissions.

At step 405, UE 115-b may select a fast recovery mode. In some examples the selection is based on low latency operation. In some examples, the selection is based on a configuration of at least one high priority bearer. In some examples, the selection is based on MAC signaling or RRC signaling.

At 410, UE 115-b may receive one or more transport blocks from base station 105-b. In some cases, the transport blocks may include low-latency data that may be sensitive to delay. In some cases, base station 105-b may maintain a set of transport blocks in a buffer for a minimum time period for retransmission.

At 415, UE 115-b may detect a transmission error. In some cases, UE 115-b may detect the transmission error based on the state of a HARQ process. For example, a transport block may not be received correctly.

At 420, UE 115-b may respond to base station 105-b with ACK/NACKs for the received transport blocks. For example, a NACK may be sent for the transport block that was not received correctly. Thus, UE 115-b may transmit a NACK based on the state of the HARQ process. In some cases, the HARQ response may be subject to a transmission or reception error.

In some cases, UE 115-b may maintain a list of non-terminated transmissions. UE 115-b may update the list based on the received transport blocks. In some cases, the list may be maintained by UE's 115-b MAC layer. In some examples, each entry in the list is mapped to a time index. In some examples the list is limited to a set of high priority HARQ processes or transport blocks, which may be based on low latency operation. In some cases, the UE 115-b may maintain the state of the non-terminated transmissions in the list for a configurable window.

At 425, UE 115-b may initiate a timer based on the detection of the transmission error. The timer may be based on the fast error recovery mode.

At 430, UE 115-b may generate an error report based on determining that the timer has expired before a grant for a retransmission for the HARQ process has been received.

At 435, UE 115-b may report the failure, e.g., by indicating which HARQ processes or transport blocks were unsuccessfully received. In some examples reporting the transmission error includes sending an error indication to an RLC entity, a PDCP entity, or a MAC entity of the base station 105-b. In some examples, reporting the transmission error includes sending an error indication to an entity of a scheduling device. In some examples, reporting the transmission error includes sending a bitmap corresponding to the list. In some examples, UE 115-b may identify a new data indicator (NDI) for the HARQ state prior to the expiration of the timer and report a transmission error. In some examples, the transmission error is reported prior to receiving a next RLC PDU. In some cases, transmitting a failure report may include transmitting an RLC status report based on the error indication. In some examples, transmitting the RLC status report includes sending the error indication (e.g., to an entity of the base station 105-b) using a contention based resource. In some examples, sending the error indication includes sending (e.g., to an entity of the base station 105-b) the error indication using a contention based resource.

At 440, the base station 105-b may schedule a retransmission for the failed transmission. At 445, the base station 105-b may transmit a second set of transport blocks, which may include scheduled retransmissions.

Figure 5:
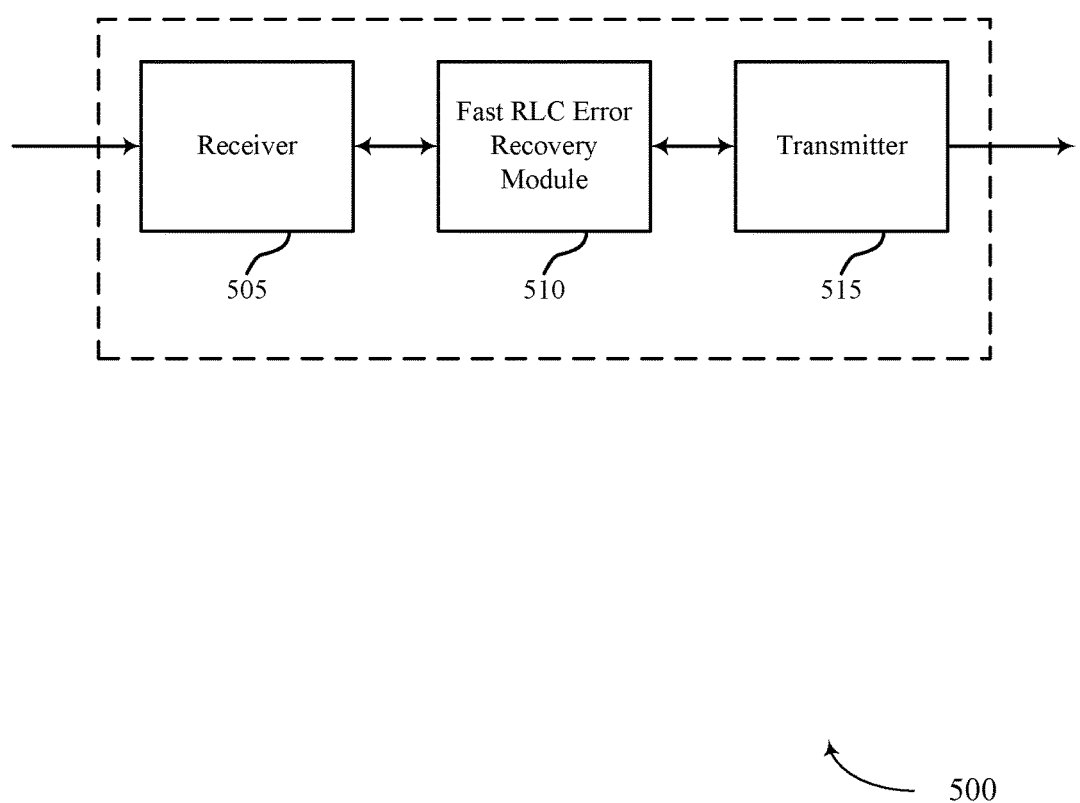
FIG. 5-7 show block diagrams of wireless devices that support fast RLC error recovery with low latency transmissions in accordance with various aspects of the present disclosure.

FIG. 5 shows a block diagram of a wireless device 500 configured for fast RLC error recovery with low latency transmissions in accordance with various aspects of the present disclosure. Wireless device 500 may be an example of aspects of a base station 105 or UE 115 described with reference to FIGS. 1-4. Wireless device 500 may include a receiver 505, a fast RLC error recovery module 510, or a transmitter 515. Wireless device 500 may also include a processor. Each of these components may be in communication with one another.

The receiver 505 may receive information such as packets, user data, or control information associated with various information channels (e.g., control channels, data channels, and information related to fast RLC error recovery with low latency transmissions, etc.). Information may be passed on to the fast RLC error recovery module 510, and to other components of wireless device 500.

The fast RLC error recovery module 510 may detect a transmission error based on the state of a HARQ process, initiate a timer based on the detection of the transmission error, determine that the timer has expired before a grant for a retransmission for the HARQ process has been received, and report the transmission error based on the determination.

The transmitter 515 may transmit signals received from other components of wireless device 500. In some examples, the transmitter 515 may be collocated with the receiver 505 in a transceiver module. The transmitter 515 may include a single antenna, or may include a plurality of antennas. In some examples, the transmitter 515 may transmit an RLC status report (e.g., to an entity of a transmitting device) based on the error indication. In some examples, transmitting an RLC status report includes sending the error indication (e.g., to an entity of a transmitting device) using a contention based resource.

Figure 6:
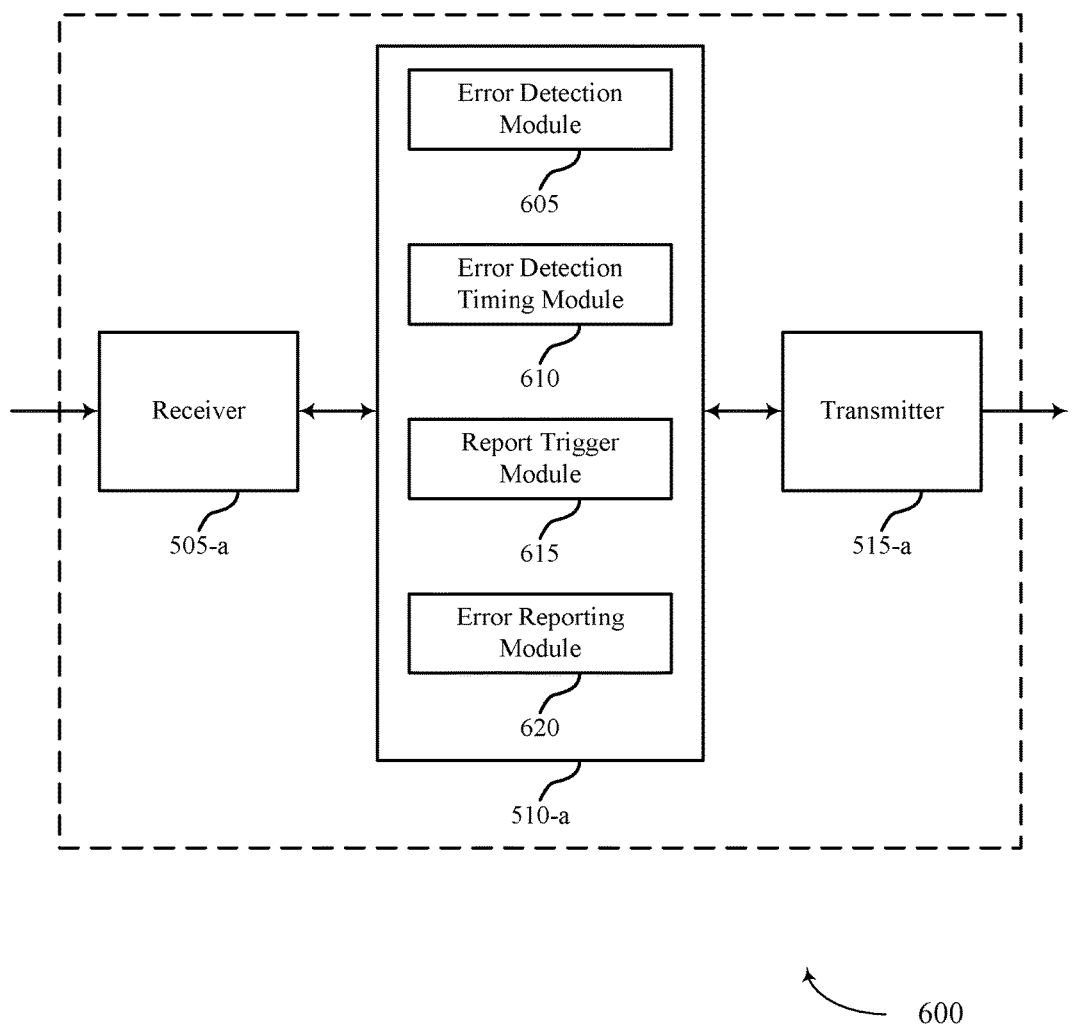

FIG. 6 shows a block diagram of a wireless device 600 for fast RLC error recovery with low latency transmissions in accordance with various aspects of the present disclosure. Wireless device 600 may be an example of aspects of a wireless device 500, a base station 105, or a UE 115 described with reference to FIGS. 1-5. Wireless device 600 may include a receiver 505-a, a fast RLC error recovery module 510-a, or a transmitter 515-a. Wireless device 600 may also include a processor. Each of these components may be in communication with one another. The fast RLC error recovery module 510-a may also include an error detection module 605, an error detection timing module 610, a report trigger module 615, and an error reporting module 620.

The receiver 505-a may receive information which may be passed on to fast RLC error recovery module 510-a, and to other components of wireless device 600. The fast RLC error recovery module 510-a may perform the operations described herein with reference to FIG. 5. The transmitter 515-a may transmit signals received from other components of wireless device 600.

The error detection module 605 may detect a transmission error based on the state of a HARQ process as described herein with reference to FIGS. 2-4.

The error detection timing module 610 may initiate a timer based on the detection of the transmission error as described herein with reference to FIGS. 2-4.

The report trigger module 615 may determine that the timer has expired before a grant for a retransmission for the HARQ process has been received as described herein with reference to FIGS. 2-4.

The error reporting module 620 may report (e.g., to an entity of a transmitting device) the transmission error based on the determination as described herein with reference to FIGS. 2-4. In some examples, the transmission error may be reported prior to receiving a next RLC PDU.

Figure 7:
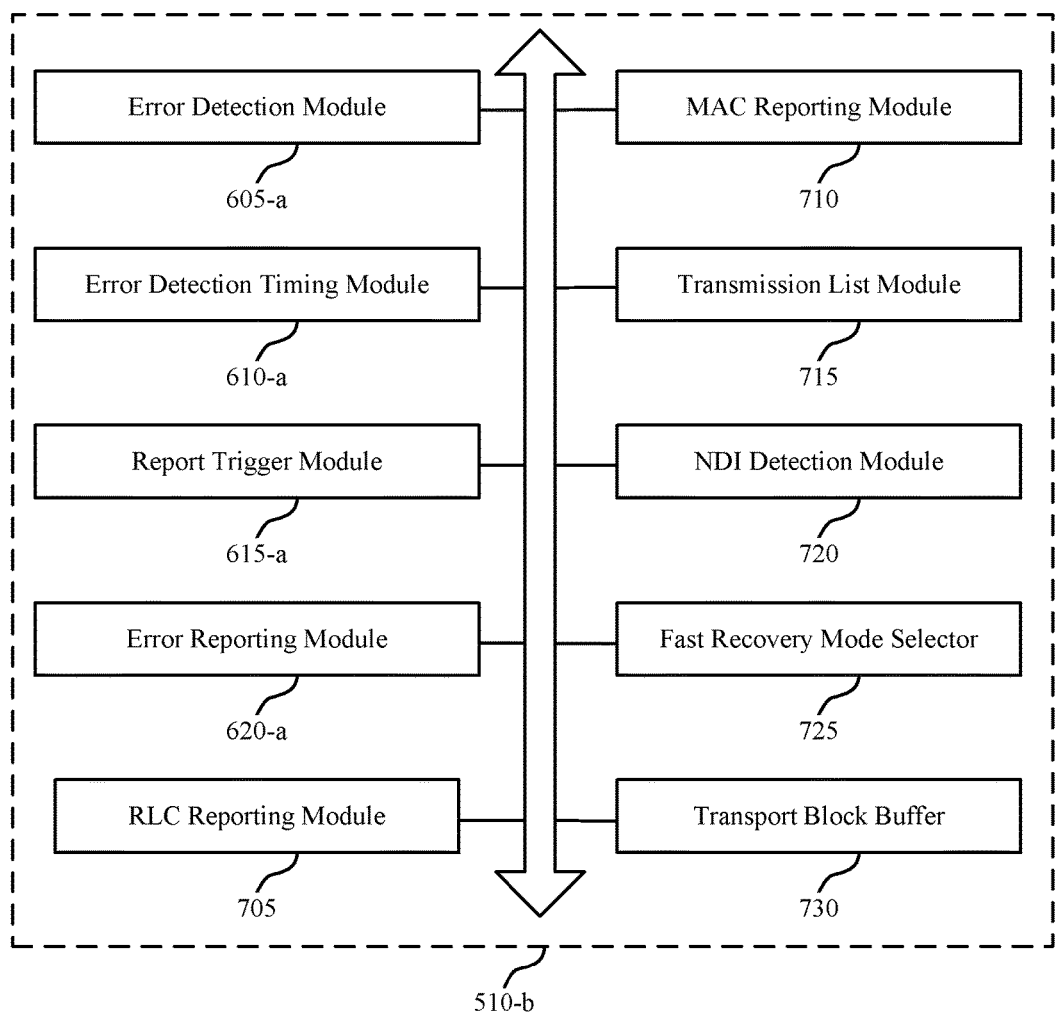

FIG. 7 shows a block diagram 700 of a fast RLC error recovery module 510-b which may be a component of a wireless device 500 or a wireless device 600 for fast RLC error recovery with low latency transmissions in accordance with various aspects of the present disclosure. The fast RLC error recovery module 510-b may be an example of aspects of a fast RLC error recovery module 510 described with reference to FIGS. 5-6. The fast RLC error recovery module 510-b may include an error detection module 605-a, an error detection timing module 610-a, a report trigger module 615-a, and an error reporting module 620-a. Each of these modules may perform the functions described herein with reference to FIG. 6. The fast RLC error recovery module 510-b may also include a RLC reporting module 705, a MAC reporting module 710, a transmission list module 715, an NDI detection module 720, a fast recovery mode selector 725, and a transport block buffer 730.

The RLC reporting module 705 may be configured such that reporting the transmission error may include sending an error indication to an RLC entity, a PDCP entity, or a MAC entity of a transmitting device, of a receiving device, or of a scheduler, as described herein with reference to FIGS. 2-4.

The MAC reporting module 710 may be configured such that reporting the transmission error may include sending an error indication to a MAC entity of a scheduling device as described herein with reference to FIGS. 2-4.

The transmission list module 715 may maintain a list of non-terminated transmissions, and reporting the transmission error may be based on the list as described herein with reference to FIGS. 2-4. In some examples, each entry in the list may be mapped to a time index. In some examples, reporting the transmission error includes sending a bitmap corresponding to the list. In some examples, the list may be limited to a set of high priority HARQ processes; the HARQ process may be an element of the set of high priority HARQ processes. In some examples, the set of high priority HARQ processes may be determined based on low latency operation.

The NDI detection module 720 may identify an NDI for the HARQ process prior to the expiration of the timer, and reporting the transmission error may be based on the NDI as described herein with reference to FIGS. 2-4.

The fast recovery mode selector 725 may select a fast recovery mode, and initiating the timer is based on the selection as described herein with reference to FIGS. 2-4. In some examples, the selection may be based on latency mode of operation (e.g. low latency operation, ultra-low latency mode). In some examples, the selection may be based on a configuration of at least one high priority bearer. In some examples, the selection may be based on MAC signaling or RRC signaling.

The transport block buffer 730 may maintain a set of transport blocks in a buffer for a minimum time period for retransmission as described herein with reference to FIGS. 2-4.

Figure 8:
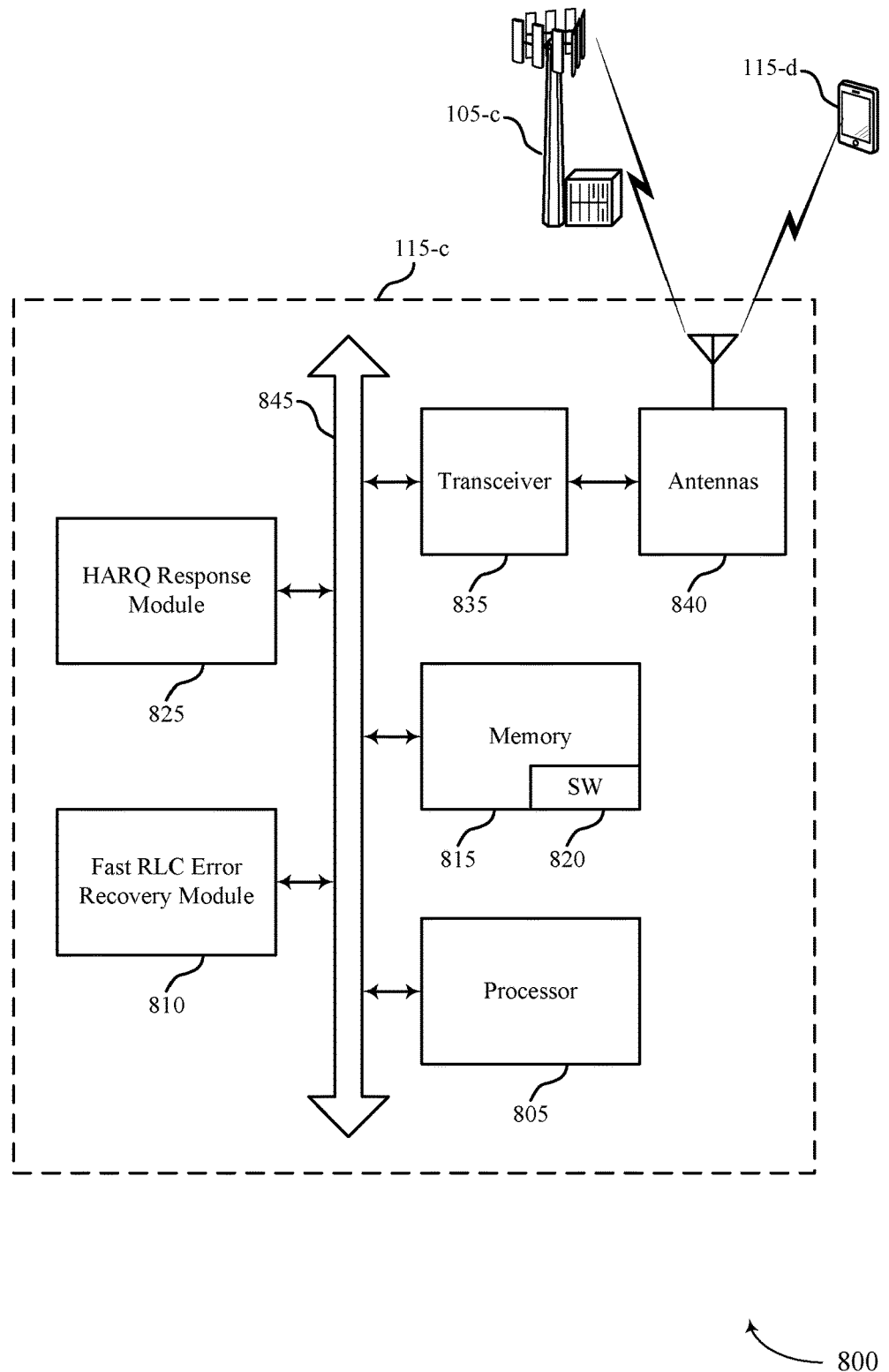
FIG. 8 illustrates a system including a UE that supports fast RLC error recovery with low latency transmissions in accordance with various aspects of the present disclosure.

FIG. 8 shows a diagram of a system 800 including a UE 115-c configured for fast RLC error recovery with low latency transmissions in accordance with various aspects of the present disclosure. System 800 may include UE 115-c, which may be an example of a wireless device 500, a wireless device 600, or a UE 115 described herein with reference to FIGS. 1, 2 and 5-7. UE 115-c may include a fast RLC error recovery module 810, which may be an example of a fast RLC error recovery module 510 described with reference to FIGS. 5-7. UE 115-c may also include a HARQ response module 825. UE 115-c may also include components for bi-directional voice and data communications including components for transmitting communications and components for receiving communications. For example, UE 115-c may communicate bi-directionally with base station 105-c or UE 115-d.

The HARQ response module 825 may send acknowledgements (e.g., ACK/NACK responses) based on the state of the HARQ process as described herein with reference to FIGS. 2-4.

UE 115-c may also include a processor 805, and memory 815 (including software (SW) 820), a transceiver 835, and one or more antenna(s) 840, each of which may communicate, directly or indirectly, with one another (e.g., via buses 845). The transceiver 835 may communicate bi-directionally, via the antenna(s) 840 or wired or wireless links, with one or more networks, as described above. For example, the transceiver 835 may communicate bi-directionally with a base station 105 or another UE 115. The transceiver 835 may include a modem to modulate the packets and provide the modulated packets to the antenna(s) 840 for transmission, and to demodulate packets received from the antenna(s) 840. While UE 115-c may include a single antenna 840, UE 115-c may also have multiple antennas 840 capable of concurrently transmitting or receiving multiple wireless transmissions.

The memory 815 may include random access memory (RAM) and read only memory (ROM). The memory 815 may store computer-readable, computer-executable software/firmware code 820 including instructions that, when executed, cause the processor 805 to perform various functions described herein (e.g., fast RLC error recovery with low latency transmissions, etc.). Alternatively, the software/firmware code 820 may not be directly executable by the processor 805 but cause a computer (e.g., when compiled and executed) to perform functions described herein. The processor 805 may include an intelligent hardware device, (e.g., a central processing unit (CPU), a microcontroller, an ASIC, etc.)

Figure 9:
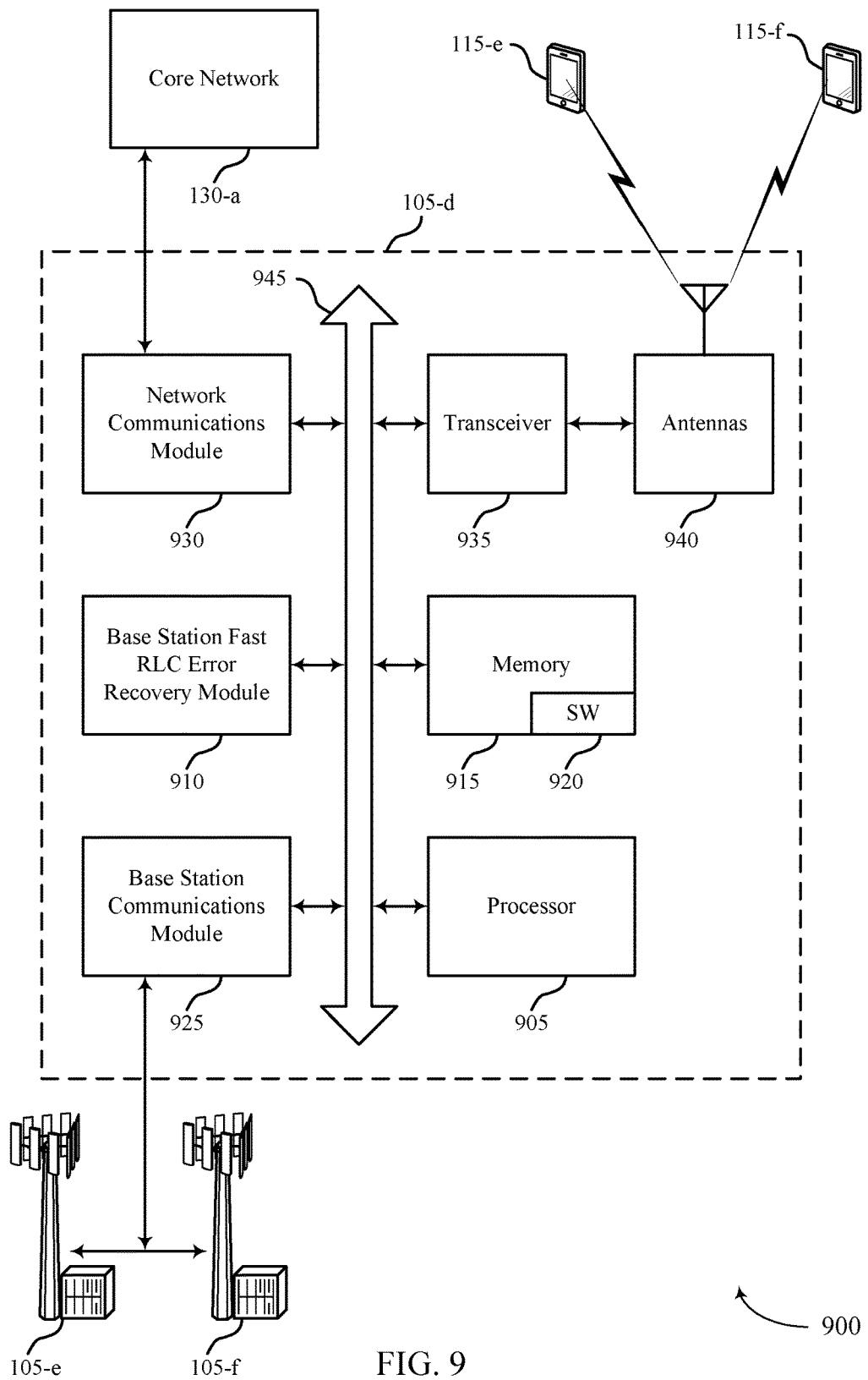
FIG. 9 illustrates a system including a base station that supports fast RLC error recovery with low latency transmissions in accordance with various aspects of the present disclosure.

FIG. 9 shows a diagram of a system 900 including a base station 105-d configured for fast RLC error recovery with low latency transmissions in accordance with various aspects of the present disclosure. System 900 may include base station 105-d, which may be an example of a wireless device 600, a wireless device 700, or a base station 105 described herein with reference to FIGS. 1, 2 and 6-8. Base station 105-d may include a base station fast RLC error recovery module 910, which may be an example of a base station fast RLC error recovery module 910 described with reference to FIGS. 6-8. Base station 105-d may also include components for bi-directional voice and data communications including components for transmitting communications and components for receiving communications. For example, base station 105-d may communicate bi-directionally with base station 105-e, base station 105-f, UE 115-e, or UE 115-f.

In some cases, base station 105-d may have one or more wired backhaul links. Base station 105-d may have a wired backhaul link (e.g., S1 interface, etc.) to the core network 130. Base station 105-d may also communicate with other base stations 105, such as base station 105-e and base station 105-f via inter-base station backhaul links (e.g., an X2 interface). Each of the base stations 105 may communicate with UEs 115 using the same or different wireless communications technologies. In some cases, base station 105-d may communicate with other base stations such as 105-e or 105-f utilizing base station communications module 925. In some examples, base station communications module 925 may provide an X2 interface within an LTE/LTE-A wireless communication network technology to provide communication between some of the base stations 105. In some examples, base station 105-d may communicate with other base stations through core network 130. In some cases, base station 105-d may communicate with the core network 130 through network communications module 930.

The base station 105-d may include a processor 905, memory 915 (including software (SW) 920), transceiver 935, and antenna(s) 940, which each may be in communication, directly or indirectly, with one another (e.g., over bus system 945). The transceivers 935 may be configured to communicate bi-directionally, via the antenna(s) 940, with the UEs 115, which may be multi-mode devices. The transceiver 935 (or other components of the base station 105-d) may also be configured to communicate bi-directionally, via the antennas 940, with one or more other base stations (not shown). The transceiver 935 may include a modem configured to modulate the packets and provide the modulated packets to the antennas 940 for transmission, and to demodulate packets received from the antennas 940. The base station 105-d may include multiple transceivers 935, each with one or more associated antennas 940. The transceiver may be an example of a combined receiver 505 and transmitter 515 of FIG. 5.

The memory 915 may include RAM and ROM. The memory 915 may also store computer-readable, computer-executable software code 920 containing instructions that are configured to, when executed, cause the processor 910 to perform various functions described herein (e.g., fast RLC error recovery with low latency transmissions, selecting coverage enhancement techniques, call processing, database management, message routing, etc.). Alternatively, the software 920 may not be directly executable by the processor 905 but be configured to cause the computer, e.g., when compiled and executed, to perform functions described herein. The processor 905 may include an intelligent hardware device, e.g., a CPU, a microcontroller, an ASIC, etc. The processor 905 may include various special purpose processors such as encoders, queue processing modules, base band processors, radio head controllers, digital signal processor (DSPs), and the like.

The base station communications module 925 may manage communications with other base stations 105. The communications management module may include a controller or scheduler for controlling communications with UEs 115 in cooperation with other base stations 105. For example, the base station communications module 925 may coordinate scheduling for transmissions to UEs 115 for various interference mitigation techniques such as beamforming or joint transmission.

The components of wireless device 500, wireless device 600, fast RLC error recovery module 510-*b*, system 800, and system 900 may each, individually or collectively, be implemented with at least one application specific integrated circuit (ASIC) adapted to perform some or all of the applicable functions in hardware. Alternatively, the functions may be performed by one or more other processing units (or cores), on at least one integrated circuit (IC). In other examples, other types of integrated circuits may be used (e.g., Structured/Platform ASICs, a field programmable gate array (FPGA), or another semi-custom IC), which may be programmed in any manner known in the art. The functions of each unit may also be implemented, in whole or in part, with instructions embodied in a memory, formatted to be executed by one or more general or application-specific processors.

Figure 10:
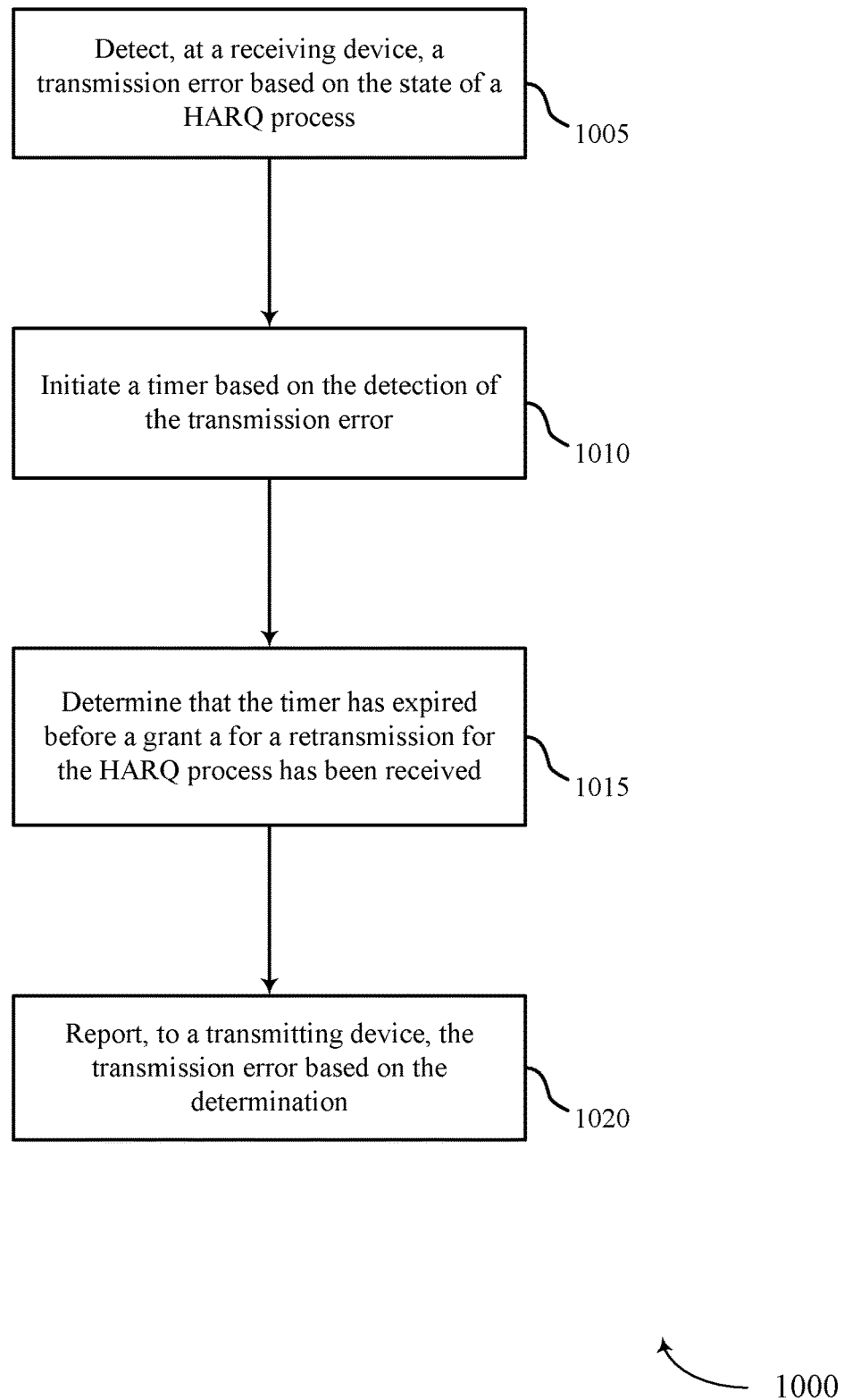
FIGS. 10-15 illustrate methods for fast RLC error recovery with low latency transmissions in accordance with various aspects of the present disclosure.

FIG. 10 shows a flowchart illustrating a method 1000 for fast RLC error recovery with low latency transmissions in accordance with various aspects of the present disclosure. The operations of method 1000 may be implemented by a device, such as a UE 115 or base station 105, or its components as described with reference to FIGS. 1-9. For example, the operations of method 1000 may be performed by the fast RLC error recovery module 510 as described with reference to FIGS. 5-8. In some examples, a device may execute a set of codes to control the functional elements of the device to perform the functions described below. Additionally or alternatively, the device may perform aspects the functions described below using special-purpose hardware.

At block 1005, the device may detect, at a receiving device, a transmission error based on the state of a HARQ process as described herein with reference to FIGS. 2-4. In certain examples, the operations of block 1005 may be performed by the error detection module 605 as described herein with reference to FIG. 6.

At block 1010, the device may initiate a timer based on the detection of the transmission error as described herein with reference to FIGS. 2-4. In certain examples, the operations of block 1010 may be performed by the error detection timing module 610 as described herein with reference to FIG. 6.

At block 1015, the device may determine that the timer has expired before a grant for a retransmission for the HARQ process has been received as described herein with reference to FIGS. 2-4. In certain examples, the operations of block 1015 may be performed by the report trigger module 615 as described herein with reference to FIG. 6.

At block 1020, the device may report, to a transmitting device, the transmission error based on the determination as described herein with reference to FIGS. 2-4. In certain examples, the operations of block 1020 may be performed by the error reporting module 620 as described herein with reference to FIG. 6.

Figure 11:
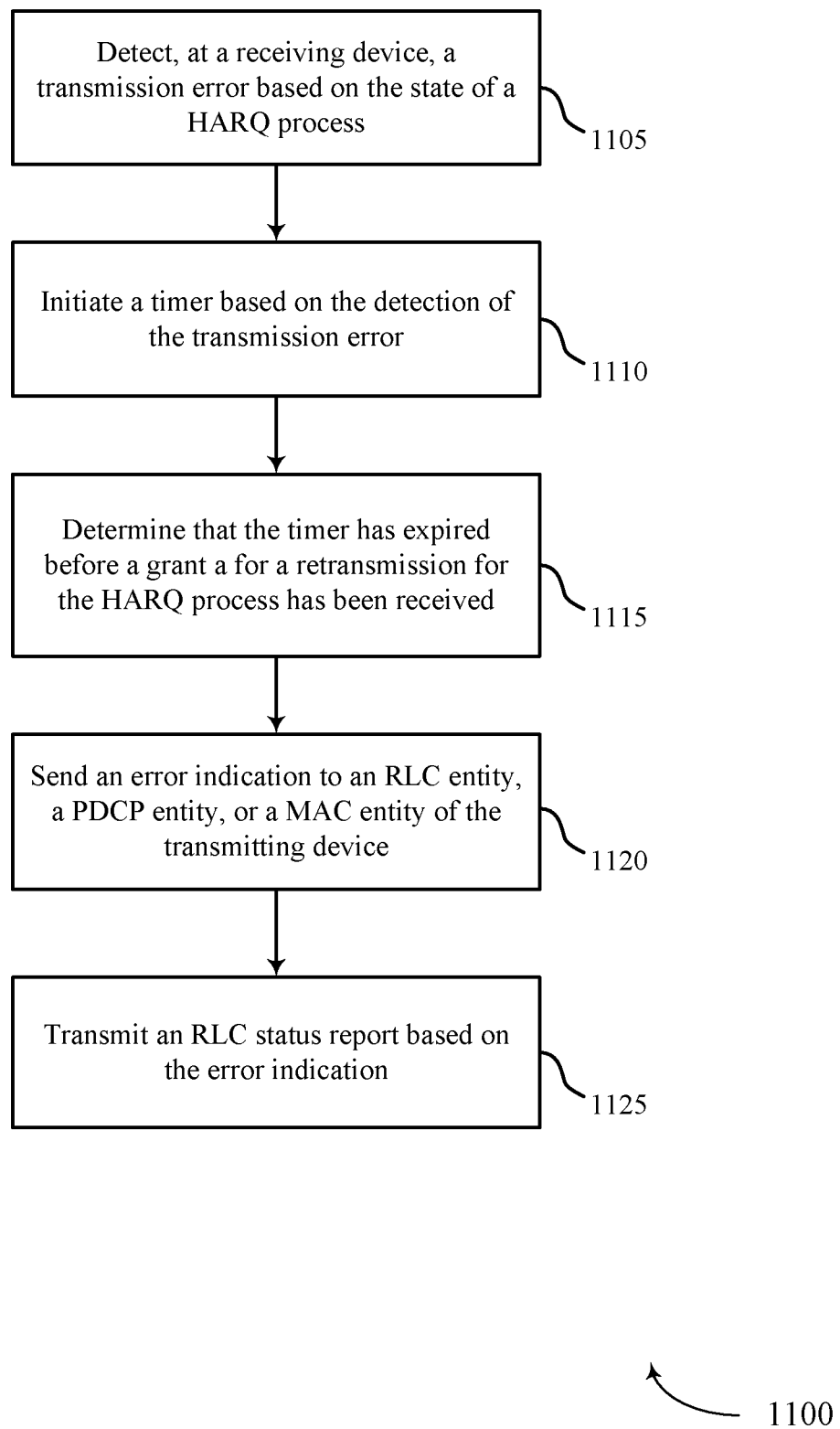

FIG. 11 shows a flowchart illustrating a method 1100 for fast RLC error recovery with low latency transmissions in accordance with various aspects of the present disclosure. The operations of method 1100 may be implemented by a device, such as a UE 115 or base station 105, or its components as described with reference to FIGS. 1-9. For example, the operations of method 1100 may be performed by the fast RLC error recovery module 510 as described with reference to FIGS. 5-8. In some examples, a device may execute a set of codes to control the functional elements of the device to perform the functions described below. Additionally or alternatively, the device may perform aspects the functions described below using special-purpose hardware. The method 1100 may also incorporate aspects of method 1000 of FIG. 10.

At block 1105, the device may detect, at a receiving device, a transmission error based on the state of a HARQ process as described herein with reference to FIGS. 2-4. In certain examples, the operations of block 1105 may be performed by the error detection module 605 as described herein with reference to FIG. 6.

At block 1110, the device may initiate a timer based on the detection of the transmission error as described herein with reference to FIGS. 2-4. In certain examples, the operations of block 1110 may be performed by the error detection timing module 610 as described herein with reference to FIG. 6.

At block 1115, the device may determine that the timer has expired before a grant for a retransmission for the HARQ process has been received as described herein with reference to FIGS. 2-4. In certain examples, the operations of block 1115 may be performed by the report trigger module 615 as described herein with reference to FIG. 6.

At block 1120, the device may report, to a transmitting device, the transmission error based on the determination as described herein with reference to FIGS. 2-4. In some cases, reporting the transmission error includes sending an error indication to an RLC entity, a PDCP entity, or a MAC entity of a transmitting device, of a receiving device, or of a scheduler. In certain examples, the operations of block 1120 may be performed by the error reporting module 620 as described herein with reference to FIG. 6.

At block 1125, the device may transmit an RLC status report based on the error indication as described herein with reference to FIGS. 2-4. In certain examples, the operations of block 1125 may be performed by the transmitter 515 as described herein with reference to FIG. 5.

Figure 12:
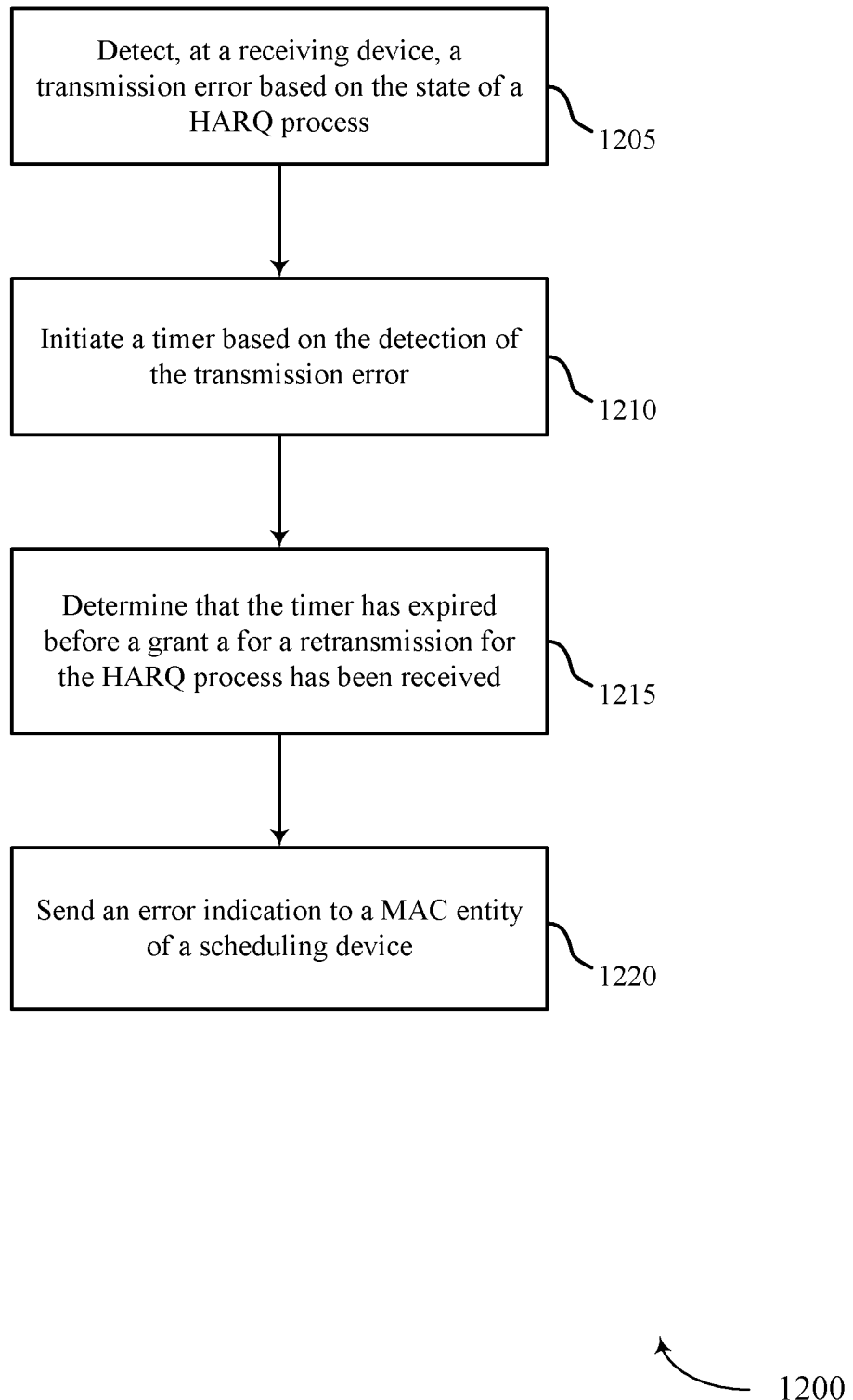

FIG. 12 shows a flowchart illustrating a method 1200 for fast RLC error recovery with low latency transmissions in accordance with various aspects of the present disclosure. The operations of method 1200 may be implemented by a device, such as a UE 115 or base station 105, or its components as described with reference to FIGS. 1-9. For example, the operations of method 1200 may be performed by the fast RLC error recovery module 510 as described with reference to FIGS. 5-8. In some examples, a device may execute a set of codes to control the functional elements of the device to perform the functions described below. Additionally or alternatively, the device may perform aspects the functions described below using special-purpose hardware. The method 1200 may also incorporate aspects of methods 1000, and 1100 of FIGS. 10-11.

At block 1205, the device may detect, at a receiving device, a transmission error based on the state of a HARQ process as described herein with reference to FIGS. 2-4. In certain examples, the operations of block 1205 may be performed by the error detection module 605 as described herein with reference to FIG. 6.

At block 1210, the device may initiate a timer based on the detection of the transmission error as described herein with reference to FIGS. 2-4. In certain examples, the operations of block 1210 may be performed by the error detection timing module 610 as described herein with reference to FIG. 6.

At block 1215, the device may determine that the timer has expired before a grant for a retransmission for the HARQ process has been received as described herein with reference to FIGS. 2-4. In certain examples, the operations of block 1215 may be performed by the report trigger module 615 as described herein with reference to FIG. 6.

At block 1220, the device may report the transmission error based on the determination as described herein with reference to FIGS. 2-4. In some cases, reporting the transmission error includes sending an error indication to a MAC entity of a scheduling device. In certain examples, the operations of block 1220 may be performed by the error reporting module 620 as described herein with reference to FIG. 6.

Figure 13:
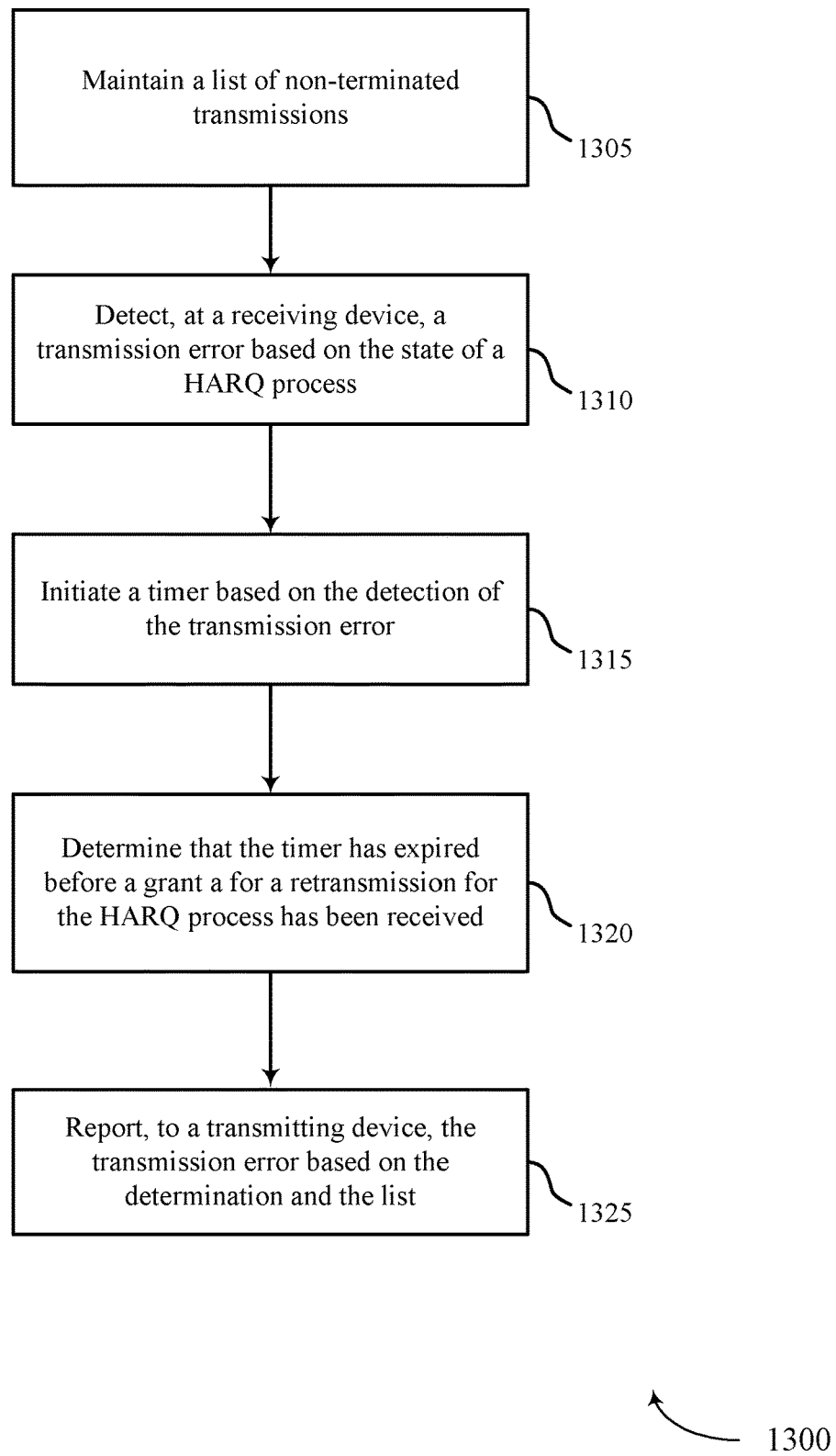

FIG. 13 shows a flowchart illustrating a method 1300 for fast RLC error recovery with low latency transmissions in accordance with various aspects of the present disclosure. The operations of method 1300 may be implemented by a device, such as a UE 115 or base station 105, or its components as described with reference to FIGS. 1-9. For example, the operations of method 1300 may be performed by the fast RLC error recovery module 510 as described with reference to FIGS. 5-8. In some examples, a device may execute a set of codes to control the functional elements of the device to perform the functions described below. Additionally or alternatively, the device may perform aspects the functions described below using special-purpose hardware. The method 1300 may also incorporate aspects of methods 1000, 1100, and 1200 of FIGS. 10-12.

At block 1305, the device may maintain a list of non-terminated transmissions, and reporting the transmission error may be based on the list as described herein with reference to FIGS. 2-4. In certain examples, the operations of block 1305 may be performed by the transmission list module 715 as described herein with reference to FIG. 7.

At block 1310, the device may detect a transmission error based on the state of a HARQ process as described herein with reference to FIGS. 2-4. In certain examples, the operations of block 1310 may be performed by the error detection module 605 as described herein with reference to FIG. 6.

At block 1315, the device may initiate a timer based on the detection of the transmission error as described herein with reference to FIGS. 2-4. In certain examples, the operations of block 1315 may be performed by the error detection timing module 610 as described herein with reference to FIG. 6.

At block 1320, the device may determine that the timer has expired before a grant for a retransmission for the HARQ process has been received as described herein with reference to FIGS. 2-4. In certain examples, the operations of block 1320 may be performed by the report trigger module 615 as described herein with reference to FIG. 6.

At block 1325, the device may report the transmission error based on the determination as described herein with reference to FIGS. 2-4. In certain examples, the operations of block 1325 may be performed by the error reporting module 620 as described herein with reference to FIG. 6.

Figure 14:
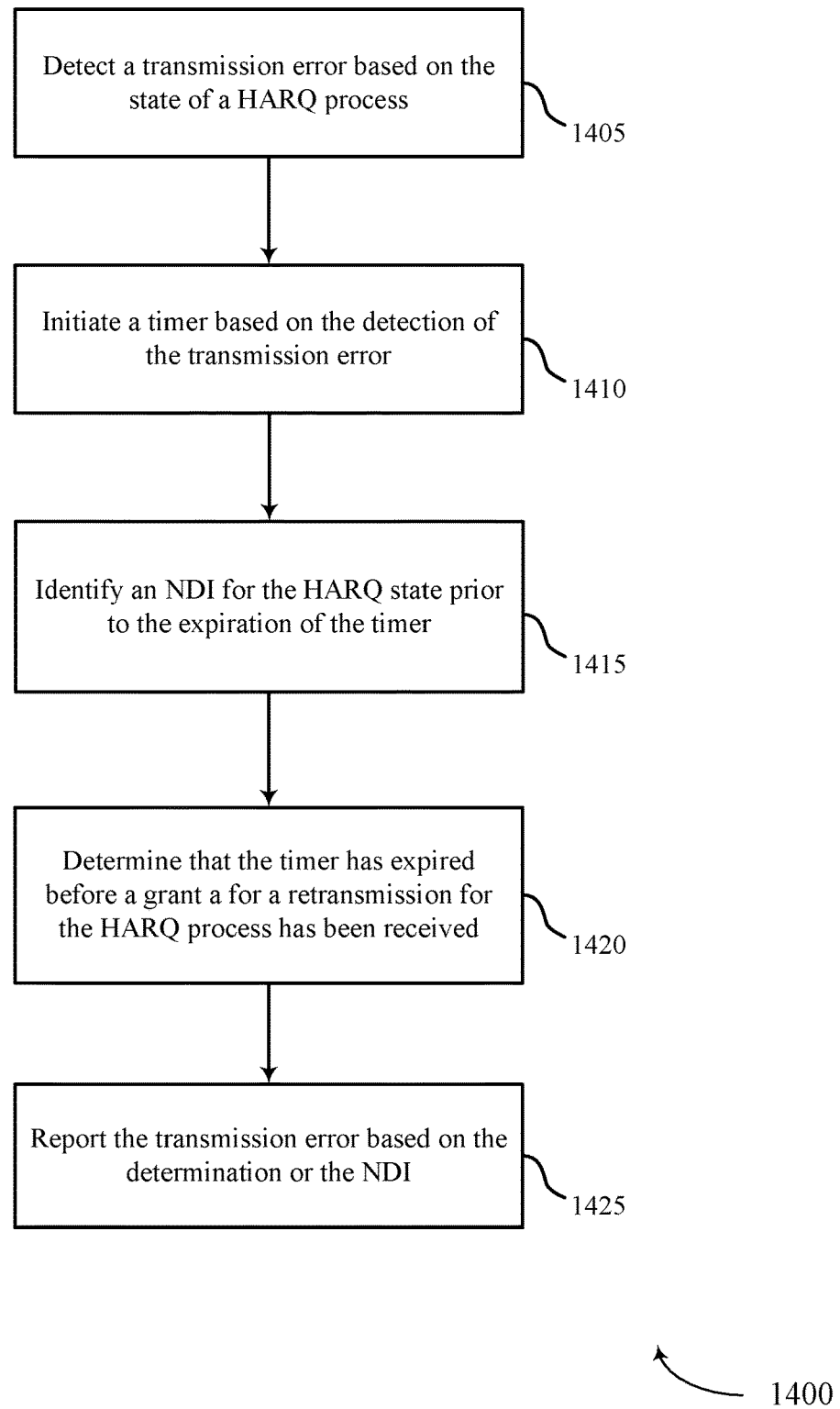

FIG. 14 shows a flowchart illustrating a method 1400 for fast RLC error recovery with low latency transmissions in accordance with various aspects of the present disclosure. The operations of method 1400 may be implemented by a device, such as a UE 115 or base station 105, or its components as described with reference to FIGS. 1-9. For example, the operations of method 1400 may be performed by the fast RLC error recovery module 510 as described with reference to FIGS. 5-8. In some examples, a device may execute a set of codes to control the functional elements of the device to perform the functions described below. Additionally or alternatively, the device may perform aspects the functions described below using special-purpose hardware. The method 1400 may also incorporate aspects of methods 1000, 1100, 1200, and 1300 of FIGS. 10-13.

At block 1405, the device may detect a transmission error based on the state of a HARQ process as described herein with reference to FIGS. 2-4. In certain examples, the operations of block 1405 may be performed by the error detection module 605 as described herein with reference to FIG. 6.

At block 1410, the device may initiate a timer based on the detection of the transmission error as described herein with reference to FIGS. 2-4. In certain examples, the operations of block 1410 may be performed by the error detection timing module 610 as described herein with reference to FIG. 6.

At block 1415, the device may identify an NDI for the HARQ process prior to the expiration of the timer as described herein with reference to FIGS. 2-4. In certain examples, the operations of block 1415 may be performed by the NDI detection module 720 as described herein with reference to FIG. 7.

At block 1420, the device may determine that the timer has expired before a grant for a retransmission for the HARQ process has been received as described herein with reference to FIGS. 2-4. In certain examples, the operations of block 1420 may be performed by the report trigger module 615 as described herein with reference to FIG. 6.

At block 1425, the device may report the transmission error based on the determination, and reporting the transmission error may be based on the NDI as described herein with reference to FIGS. 2-4. In certain examples, the operations of block 1425 may be performed by the error reporting module 620 as described herein with reference to FIG. 6.

Figure 15:
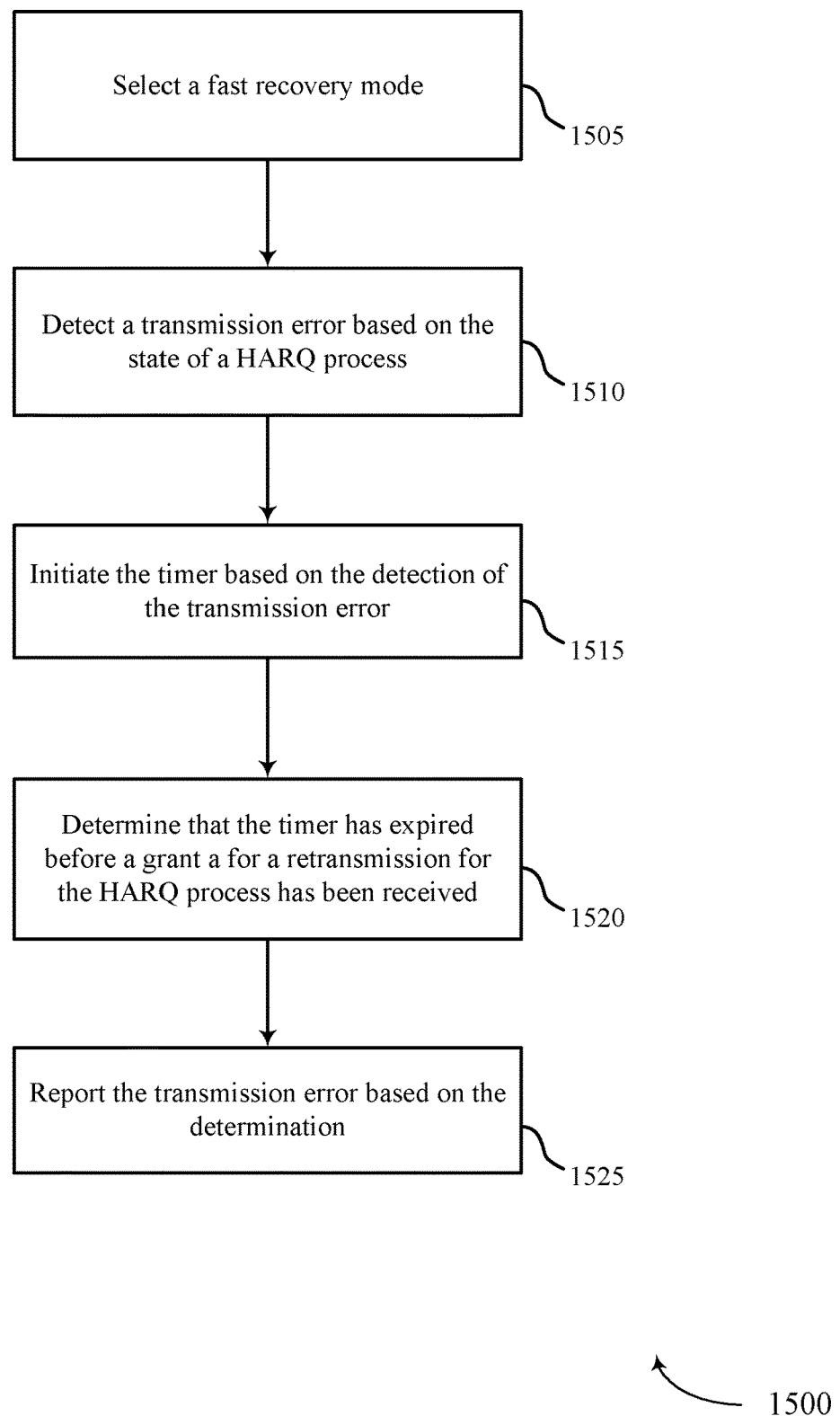

FIG. 15 shows a flowchart illustrating a method 1500 for fast RLC error recovery with low latency transmissions in accordance with various aspects of the present disclosure. The operations of method 1500 may be implemented by a device, such as a UE 115 or base station 105, or its components as described with reference to FIGS. 1-9. For example, the operations of method 1500 may be performed by the fast RLC error recovery module 510 as described with reference to FIGS. 5-8. In some examples, a device may execute a set of codes to control the functional elements of the device to perform the functions described below. Additionally or alternatively, the device may perform aspects the functions described below using special-purpose hardware. The method 1500 may also incorporate aspects of methods 1000, 1100, 1200, 1300, and 1400 of FIGS. 10-14.

At block 1505, the device may select a fast recovery mode; initiating a timer may be based on the selection as described herein with reference to FIGS. 2-4. In certain examples, the operations of block 1505 may be performed by the fast recovery mode selector 725 as described herein with reference to FIG. 7.

At block 1510, the device may detect a transmission error based on the state of a HARQ process as described herein with reference to FIGS. 2-4. In certain examples, the operations of block 1510 may be performed by the error detection module 605 as described herein with reference to FIG. 6.

At block 1515, the device may initiate the timer based on the detection of the transmission error as described herein with reference to FIGS. 2-4. In certain examples, the operations of block 1515 may be performed by the error detection timing module 610 as described herein with reference to FIG. 6.

At block 1520, the device may determine that the timer has expired before a grant for a retransmission for the HARQ process has been received as described herein with reference to FIGS. 2-4. In certain examples, the operations of block 1520 may be performed by the report trigger module 615 as described herein with reference to FIG. 6.

At block 1525, the device may report the transmission error based on the determination as described herein with reference to FIGS. 2-4. In certain examples, the operations of block 1525 may be performed by the error reporting module 620 as described herein with reference to FIG. 6.

Thus, methods 1000, 1100, 1200, 1300, 1400, and 1500 may provide for fast RLC error recovery with low latency transmissions. It should be noted that methods 1000, 1100, 1200, 1300, 1400, and 1500 describe possible implementation, and that the operations and the steps may be rearranged or otherwise modified such that other implementations are possible. In some examples, aspects from two or more of the methods 1000, 1100, 1200, 1300, 1400, and 1500 may be combined.

The description herein provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. Also, features described with respect to some examples may be combined in other examples.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are new releases of Universal Mobile Telecommunications System (UMTS) that use E-UTRA. UTRA, E-UTRA, UMTS, LTE, LTE-A, and Global System for Mobile communications (GSM) are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-A networks, including such networks described herein, the term evolved node B (eNB) may be generally used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using frequency division duplex (FDD) (e.g., using paired spectrum resources) or TDD operation (e.g., using unpaired spectrum resources). Frame structures may be defined for FDD (e.g., frame structure type 1) and TDD (e.g., frame structure type 2).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method of wireless communication, comprising:
   detecting, at a receiving device, a transmission error based at least in part on a decoding failure of a transmission from a transmitting device and a state of a hybrid automatic repeat request (HARQ) process;
   initiating a timer concurrently or subsequently to detecting the transmission error;
   identifying a new data indicator (NDI) for the HARQ process;
   determining, after identifying the NDI, that the timer has expired before a grant for a retransmission for the HARQ process has been received; and
   reporting, to a transmitting device, the transmission error based at least in part on the NDI and the determination.

2. The method of claim 1, wherein reporting the transmission error comprises:
   sending, by the receiving device, an error indication to a radio link control (RLC) entity, a Packet Data Convergence Protocol (PDCP) entity, or a medium access control (MAC) entity of the transmitting device.

3. The method of claim 2, wherein sending the error indication comprises:
   sending the error indication to an entity of the transmitting device using a contention based resource.

4. The method of claim 1, further comprising:
   maintaining a list of non-terminated transmissions, wherein reporting the transmission error is based at least in part on the list.

5. The method of claim 4, wherein each entry in the list is mapped to a time index.

6. The method of claim 4, wherein reporting the transmission error comprises:
   sending, to the transmitting device, a bitmap corresponding to the list.

7. The method of claim 4, wherein the list is limited to a set of high priority HARQ processes, wherein the HARQ process is an element of the set of high priority HARQ processes.

8. The method of claim 7, wherein the set of high priority HARQ processes is determined based at least in part on latency mode of operation.

9. The method of claim 1, further comprising:
   selecting a fast recovery mode, wherein initiating the timer is based at least in part on the selection.

10. The method of claim 9, wherein the selection is based at least in part on latency mode of operation.

11. The method of claim 9, wherein the selection is based at least in part on a configuration of at least one high priority bearer.

12. The method of claim 1, further comprising:
    transmitting a negative acknowledgement (NACK) based at least in part on the state of the HARQ process.

13. The method of claim 1, further comprising:
    maintaining a set of transport blocks in a buffer for a minimum time period for retransmission.

14. An apparatus for wireless communication, comprising:
    means for detecting, at a receiving device, a transmission error based at least in part on a decoding failure of a transmission from a transmitting device and a state of a hybrid automatic repeat request (HARQ) process;
    means for initiating a timer concurrently or subsequently to detecting the transmission error;
    means for identifying a new data indicator (NDI) for the HARQ process;
    means for determining, after identifying the NDI, that the timer has expired before a grant for a retransmission for the HARQ process has been received; and
    means for reporting, to a transmitting device, the transmission error based at least in part on the NDI and the determination.

15. An apparatus for wireless communication, comprising:
    a processor;
    memory in electronic communication with the processor; and
    instructions stored in the memory and operable, when executed by the processor, to cause the apparatus to:
    detect, at a receiving device, a transmission error based at least in part on a decoding failure of a transmission from a transmitting device and a state of a hybrid automatic repeat request (HARQ) process;
    initiate a timer concurrently or subsequently to detecting the transmission error;
    identify a new data indicator (NDI) for the HARQ process;
    determine, after identifying the NDI, that the timer has expired before a grant for a retransmission for the HARQ process has been received; and
    report, to a transmitting device, the transmission error based at least in part on the NDI and the determination.

16. The apparatus of claim 15, wherein the instructions operable to cause the apparatus to report the transmission error comprise instructions operable to cause the apparatus to:
    send, by the receiving device, an error indication to a radio link control (RLC) entity, a Packet Data Convergence Protocol (PDCP) entity, or a medium access control (MAC) entity of the transmitting device.

17. The apparatus of claim 16, wherein the instructions operable to cause the apparatus to send the error indication comprise instructions operable to cause the apparatus to:
    send the error indication to an entity of the transmitting device using a contention based resource.

18. The apparatus of claim 15, wherein the instructions are operable to further cause the apparatus to:
    maintain a list of non-terminated transmissions, wherein reporting the transmission error is based at least in part on the list.

19. The apparatus of claim 18, wherein each entry in the list is mapped to a time index.

20. The apparatus of claim 18, wherein the instructions operable to cause the apparatus to report the transmission error comprise instructions operable to cause the apparatus to:
    send, to the transmitting device, a bitmap corresponding to the list.

21. The apparatus of claim 18, wherein the list is limited to a set of high priority HARQ processes, wherein the HARQ process is an element of the set of high priority HARQ processes.

22. The apparatus of claim 21, wherein the set of high priority HARQ processes is determined based at least in part on latency mode of operation.

23. The apparatus of claim 15, wherein the instructions are operable to further cause the apparatus to:
    select a fast recovery mode, wherein initiating the timer is based at least in part on the selection.

24. The apparatus of claim 23, wherein the selection is based at least in part on low latency operation.

25. The apparatus of claim 23, wherein the selection is based at least in part on a configuration of at least one high priority bearer.

26. The apparatus of claim 15, wherein the instructions are operable to further cause the apparatus to:
   transmit a negative acknowledgement (NACK) based at least in part on the state of the HARQ process.

27. The apparatus of claim 15, wherein the instructions are operable to further cause the apparatus to:
   maintain a set of transport blocks in a buffer for a minimum time period for retransmission.

28. A non-transitory computer-readable medium storing code for wireless communication, the code comprising instructions executable to:
   detect, at a receiving device, a transmission error based at least in part on a decoding failure of a transmission from a transmitting device and a state of a hybrid automatic repeat request (HARQ) process;
   initiate a timer concurrently or subsequently to detecting the transmission error;
   identify a new data indicator (NDI) for the HARQ process;
   determine, after identifying the NDI, that the timer has expired before a grant for a retransmission for the HARQ process has been received; and
   report, to a transmitting device, the transmission error based at least in part on the NDI and the determination.

* * * * *